(12) United States Patent
Senoo

(10) Patent No.: US 8,083,642 B2
(45) Date of Patent: Dec. 27, 2011

(54) TRANSMISSION APPARATUS

(75) Inventor: Takashi Senoo, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 717 days.

(21) Appl. No.: 12/208,969

(22) Filed: Sep. 11, 2008

(65) Prior Publication Data

US 2009/0082156 A1 Mar. 26, 2009

(30) Foreign Application Priority Data

Sep. 21, 2007 (JP) .................. 2007-244656
May 26, 2008 (JP) .................. 2008-136252

(51) Int. Cl.
*F16H 59/00* (2006.01)
*F16H 59/60* (2006.01)
*F16H 59/62* (2006.01)

(52) U.S. Cl. ............. 477/175; 477/97; 477/98; 477/180
(58) Field of Classification Search ................... 477/97, 477/98, 174–181
See application file for complete search history.

(56) References Cited

U.S. PATENT DOCUMENTS

| 7,169,078 B2 * | 1/2007 | Ishikawa et al. ............ 477/102 |
| 2004/0174018 A1 * | 9/2004 | Itoh ............................ 290/40 C |
| 2006/0234830 A1 * | 10/2006 | Iriyama et al. ............... 477/109 |
| 2007/0254775 A1 | 11/2007 | Kishi |

FOREIGN PATENT DOCUMENTS

JP 2007-092814 4/2007
KR 2006-0057334 A 5/2006

OTHER PUBLICATIONS

Office Action in Korean Patent Application No. 10-2008-0091856, dated May 26, 2010 (3 pages).
Patent Abstracts of Japan, Publication No. 2007092814 a, Publication Date Apr. 12, 2007, 2 pages.

* cited by examiner

*Primary Examiner* — Tisha Lewis
(74) *Attorney, Agent, or Firm* — Osha • Liang LLP

(57) ABSTRACT

A transmission apparatus includes a wet rotary clutch configured to transmit power from an input to an output when in an engaged position, a clutch lubricator to supply a lubricating oil to the wet rotary clutch, a synchromesh configured to perform a meshing operation while the wet rotary clutch is in the disengaged position, and a controller configured to increase a revolution speed of the input of the wet rotary clutch before the synchromesh begins the meshing operation.

17 Claims, 13 Drawing Sheets

FIG. 3

(a)
Upshift

| Gear position | First gear | Second gear | Third gear | Fourth gear | Fifth gear | Sixth gear | Reverse |
|---|---|---|---|---|---|---|---|
| Odd numbered gear position clutch C1 | O | | O | | O | | O |
| Even numbered gear position clutch C2 | | O | | O | | O | |
| Odd numbered gear position group | First gear | 1→3 Pre-shift | | 3→5 Pre-shift | | Fifth gear | Reverse |
| Even numbered gear position group | | Second gear | | 2→4 Pre-shift | | 4→6 Pre-shift | |

(b)
Downshift

| Gear position | First gear | Second gear | Third gear | Fourth gear | Fifth gear | Sixth gear | Reverse |
|---|---|---|---|---|---|---|---|
| Odd numbered gear position clutch C1 | O | | O | | O | | O |
| Even numbered gear position clutch C2 | | O | | O | | O | |
| Odd numbered gear position group | | 1←3 Pre-shift | | 3←5 Pre-shift | | Fifth gear | Reverse |
| Even numbered gear position group | Second gear | 2←4 Pre-shift | | 4←6 Pre-shift | | Sixth gear | | ived
TRANSMISSION APPARATUS

CROSS-REFERENCE TO RELATED APPLICATIONS

The present application claims priority from Japanese Patent Application No. 2007-244656, filed Sep. 21, 2007 and Japanese Patent Application No. 2008-136252, filed May 26, 2008. The contents of both priority applications are hereby incorporated by reference in their entirety.

BACKGROUND OF THE DISCLOSURE

1. Field of the Disclosure

The present disclosure generally relates to transmissions including an automated shift-type manual transmission wherein a manual transmission may be automatically operated. In particular, the present disclosure relates to devices to reduce drag torque caused by a viscosity of lubricating oil remaining between clutch discs even when a wet rotary clutch disengages.

2. Description of the Related Art

To form an automated shift-type manual transmission by automating a manual transmission, there must be an automated control for disengaging and engaging a clutch installed to connect and disconnect the engine and transmission. In this regard, a wet rotary clutch is generally used due to its superior controllability.

Japanese Laid-Open Patent Publication No. 2007-092814 discloses an automated shift-type manual transmission comprising a wet rotary clutch. In such transmissions, it is possible to change gear ratios or transition from a neutral mode to a forward or reverse driving mode. A synchromesh mechanism conducts a meshing operation during transition from a neutral mode to a shift mode to provide a desired gear ratio when the wet rotary clutch disengages.

The synchromesh mechanism operates when the wet rotary clutch is disengaged. Because a rotary member at an input of the synchromesh mechanism is rotated by an engine when the wet rotary clutch is engaged, the synchromesh mechanism may not synchronously rotate the rotary member at the input with respect to a rotary member at an output of the synchromesh mechanism which is rotating with a wheel. Thus, the meshing operation wherein the synchromesh mechanism is operated from the neutral mode to the shift mode to provide a desired gear ratio may not be executed due to the relative rotation of the rotary members at the input and output.

However, if the wet rotary clutch disengages, because the rotary member at the input of the synchromesh mechanism is separated from the engine, the synchromesh mechanism may not synchronously rotate the rotary member at the input with respect to the rotary member at the output of the synchromesh mechanism rotating with the wheel. Thus, the meshing operation wherein the synchromesh mechanism is operated from the neutral mode to the shift mode to provide a desired gear ratio may not be executed because there is no relative rotation of the rotary members at the input and output.

The wet rotary clutch is typically supplied with the lubricating oil for cooling or preventing abrasion. The lubricating oil prevents overheating caused by frictional heat generated by a slip in an engagement transition period or prevents abrasion of the clutch disc in the engagement transition period.

However, when the lubricating oil is supplied to the wet rotary clutch, a drag torque occurs due to the viscosity of the lubricating oil between the clutch discs. This happens even when the wet rotary clutch is disengaged.

When the drag torque occurs, the drag torque hinders the torque transferred from the engine to the rotary member at the input of the synchromesh mechanism. Thus, it becomes difficult for the synchromesh mechanism to synchronously rotate the rotary member at the input with respect to the rotary member at the output of the synchromesh mechanism. As such, it becomes difficult to operate the synchromesh mechanism from the neutral mode to the shift mode to provide a desired gear ratio to execute the meshing operation, and thereby it becomes difficult to execute the shifting operation.

To address and resolve the above-mentioned problems, the present disclosure seeks to reduce the drag torque of the wet rotary clutch by thoroughly and rapidly removing the lubricating oil interposed between the clutch discs.

SUMMARY OF THE CLAIMED SUBJECT MATTER

In one aspect, the present disclosure relates to a transmission apparatus including a wet rotary clutch configured to transmit power from an input to an output when in an engaged position, a clutch lubricator to supply a lubricating oil to the wet rotary clutch, a synchromesh configured to perform a meshing operation while the wet rotary clutch is in the disengaged position, and a controller configured to increase a revolution speed of the input of the wet rotary clutch before the synchromesh begins the meshing operation.

In another aspect, the present disclosure relates to a method to control a transmission including providing a wet rotary clutch comprising an input and an output, transmitting power from the input to the output of the wet rotary clutch when in an engaged position, supplying a lubricating oil to engage the wet rotary clutch, performing a meshing operation to gears of the transmission while the wet rotary clutch is in the disengaged position, and increasing a revolution speed to the input of the wet rotary clutch prior to performing the meshing operation.

In another aspect, the present disclosure relates to a transmission apparatus including a clutch means for transmitting power from an input to an output when in an engaged position, a lubricator means for supplying a lubricating oil to engage the clutch means, a synchromesh means for performing a meshing operation while the clutch means is in the disengaged position, and a controller configured to increase a revolution speed of the input of the clutch means before the synchromesh means begins performing the meshing operation.

BRIEF DESCRIPTION OF DRAWINGS

Features of the present disclosure will become more apparent from the following description in conjunction with the accompanying drawings.

FIG. 3 is a logic diagram showing a relationship between an engagement of a clutch and a gear position to be established in the twin-clutch manual transmission of FIG. 2 as well as showing the types of pre-shift occurring with a switching operation of a gear position.

FIG. 3(a) is a logic diagram of up-shift operations.

FIG. 3(b) is a logic diagram of down-shift operations.

DETAILED DESCRIPTION

The embodiments of the present disclosure will be explained in detail based on the accompanying drawings.

Figure 1:
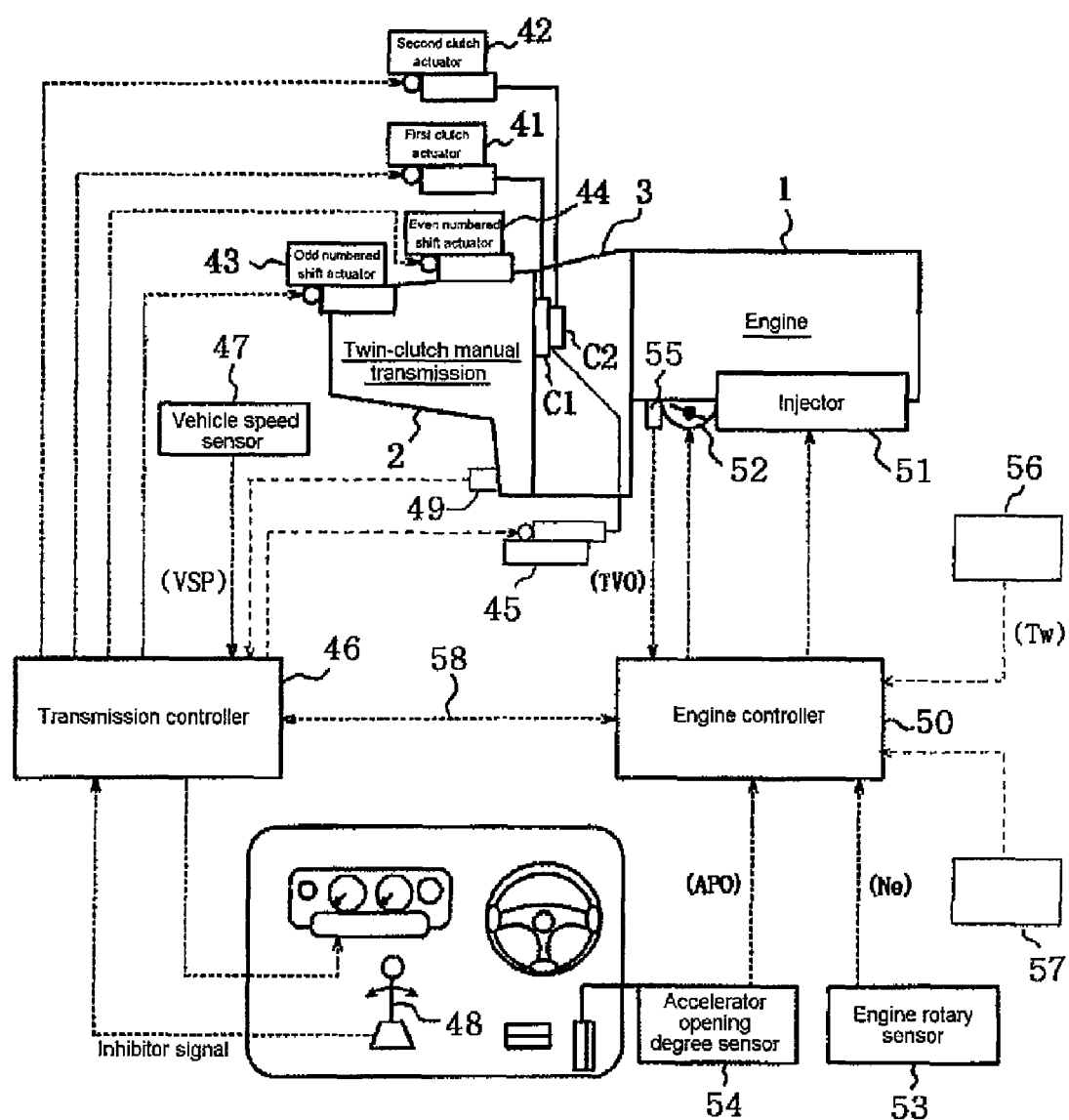
FIG. 1 is a system view showing a power train of a vehicle including a twin-clutch manual transmission provided with a drag torque reduction control device of a wet rotary clutch in accordance with one embodiment of the present disclosure.
Figure 2:
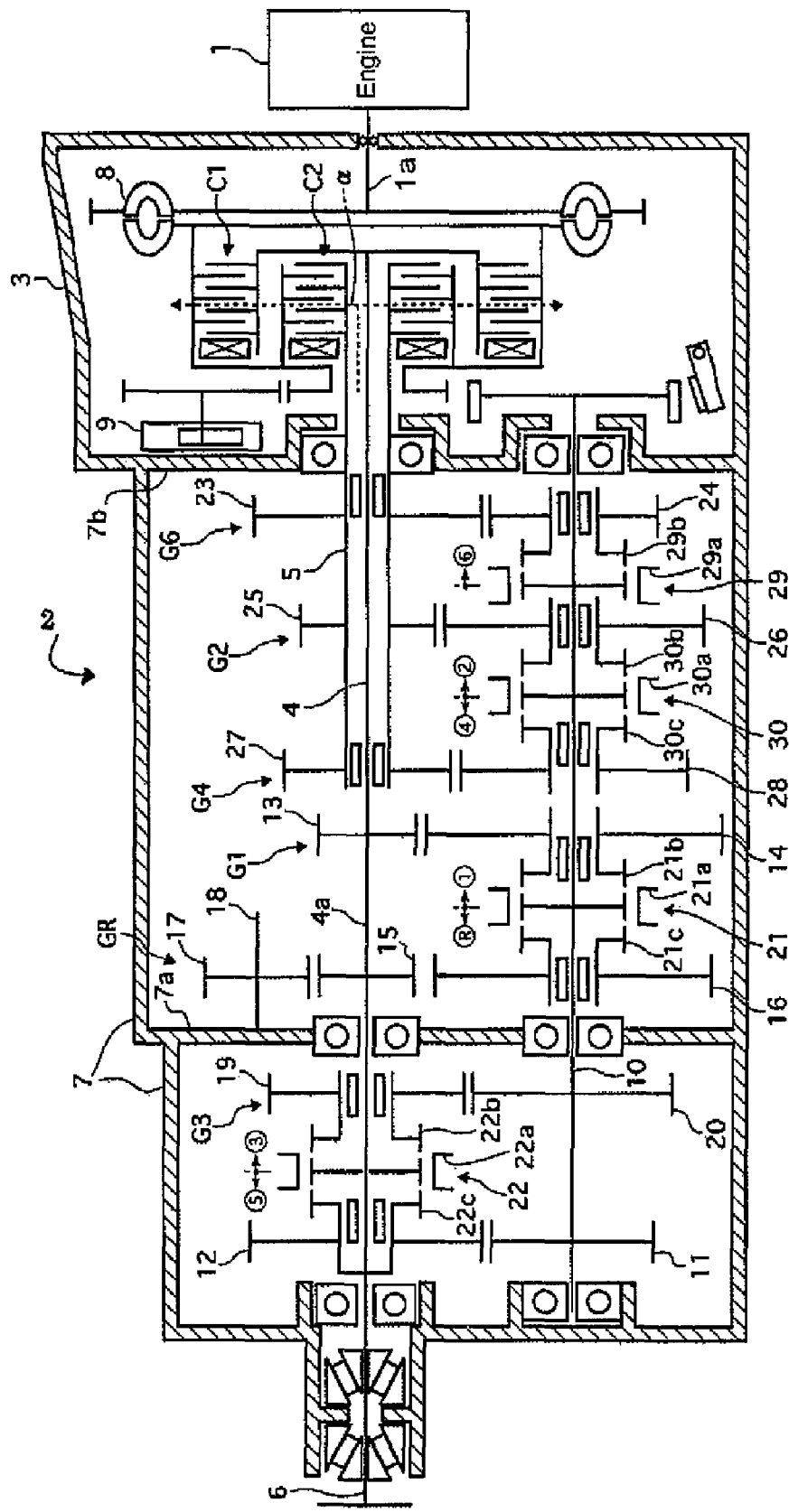
FIG. 2 is a schematic diagram showing the twin-clutch manual transmission of FIG. 1.

FIG. 1 is a system view showing a power train of a vehicle including a twin-clutch manual transmission comprising a shift control device with a control system thereof in accordance with one embodiment of the present disclosure. FIG. 2 is a schematic diagram of the twin-clutch manual transmission.

The power train for the vehicle of FIG. 1 is provided with an engine 1 and a twin-clutch manual transmission 2.

As to the twin-clutch manual transmission 2, an output shaft (crank shaft 1a) of the engine 1 is coupled to a first input shaft 4 for odd numbered gear positions (first gear, third gear, fifth gear and reverse) in the twin-clutch manual transmission and to a second input shaft 5 for even numbered gear positions (second gear, fourth gear, sixth gear) in the twin-clutch manual transmission by interposing an automated wet rotary clutch C1 for the odd numbered gear positions (first gear, third gear, fifth gear and reverse) and an automated wet rotary clutch C2 for the even numbered gear positions (second gear, fourth gear, sixth gear) in a clutch housing 3.

An output shaft 6 of the twin-clutch manual transmission is coupled to right and left driving wheels by interposing a propeller shaft or differential gear device (not shown).

The twin-clutch manual transmission will be explained in detail based on FIG. 2.

Reference numeral 7 indicates a transmission case extending from the clutch housing 3. In addition to the automated wet rotary clutch C1 for the odd numbered gear positions and the automated wet rotary clutch C2 for the even numbered gear positions, the clutch housing 3 includes a torsional damper 8 for driving and coupling the clutches C1 and C2 and the engine crank shaft 1a while damping as well as an oil pump 9 driven by the torsional damper 8.

Further, the clutch C1 for the odd numbered gear positions and the clutch C2 for the even numbered gear positions are normal-open type clutches, which are disengaged under a normal state.

By adopting the hydraulic oil from the oil pump 9 as a medium, the twin-clutch manual transmission controls the gear positions including the control of engaging and disengaging the clutches C1 and C2, as explained below.

As indicated by an arrow α, the hydraulic oil from the oil pump 9 supplies the lubricating oil from an inner peripheral portion of the clutch C2 via a fluid passage penetrated in the first input shaft 4 to the clutch C2 and the clutch C1. By doing so, the clutch C2 and the clutch C1 are cooled and protected from abrasion during an engagement transition period.

A gear shifting mechanism is housed within the transmission case 7 as described below.

The second input shaft 5 is hollow wherein an engine rotation is selectively inputted from the torsional damper 8 via the clutch C1 and the clutch C2.

The first input shaft 4 is fitted through the second input shaft 5. As such, the second input shaft 5 at an inner side and the first input shaft 4 at an outer side become relatively rotatable in a concentric manner.

A frontward end at an engine side of the first input shaft 4 and the second input shaft 5, is coupled to the clutches C1 and C2.

The first input shaft 4 protrudes from a rearward end of the second input shaft 5. Further, the output shaft 6 of the transmission is connected to a rearward end portion 4a of the first input shaft 4 to be relatively rotatable with respect to the input shaft 4. The output shaft 6 protrudes from a rearward end of the transmission case 7.

A counter shaft 10 is arranged parallel to the first input shaft 4, the second input shaft 5 and the output shaft 6. It is rotatably supported in the transmission case 7.

A counter gear 11 is integrally and rotatably installed in a rearward end of the counter shaft 10. An output gear 12 is coaxially arranged and installed on the output shaft 6. The counter gear 11 and the output gear 12 are intermeshed so that the counter shaft 10 is operatively coupled to the output shaft 6.

Here, because a pitch circle diameter of the counter gear 11 is smaller than a pitch circle diameter of the output gear 12, the counter gear 11 and the output gear 12 constitute a decelerating gear set.

Gear sets G1 and G3 of the odd numbered gear position groups (first gear and third gear) and a gear set GR of the reverse gear position are arranged between the rearward end portion 4a of the first input shaft 4 and the counter shaft 10 in the order of the first gear set G1, the reverse gear set GR and the third gear set G3 from a front side closer to the engine 1 to a rear side closer to the output shaft 6.

The first gear set G1 and the reverse gear set GR are located between the rearward end of the second input shaft 5 and a transmission case intermediate wall 7a. The reverse gear set GR is located to be the closest to the transmission case intermediate wall 7a.

The third gear set G3 is arranged at an opposite side of the transmission case intermediate wall 7a from the first gear set G1 and the reverse gear set GR. The third gear set G3 is located to be the closest to the transmission case intermediate wall 7a, i.e., the rearmost portion of the first input shaft 4 (rearward end portion 4a).

The first gear set G1 includes a first input gear 13 integrally formed in the rearward end portion 4a of the first input shaft 4 and a first output gear 14 rotatably installed on the counter shaft 10. The first input gear 13 and the first output gear 14 are arranged complementarily within the transmission case 7 so as to be intermeshed with each other.

The reverse gear set GR includes a reverse input gear 15 integrally formed on the rearward end portion 4a of the first input shaft 4, a reverse output gear 16 rotatably installed on the counter shaft 10 and a reverse idler gear 17 intermeshed with the gears 15 and 16 so as to operatively couple the gears 15 and 16 for driving in reverse. The reverse idler gear 17 is rotatably supported on a reverse idler shaft 18 installed in the transmission case intermediate wall 7a.

The third gear set G3 includes a third input gear 19 rotatably installed on the rearward end portion 4a of the first input shaft 4 and a third output gear 20 installed on the counter shaft 10. The third input gear 19 and the third output gear 20 are arranged complementarily within the transmission case 7 so as to be intermeshed with each other.

A 1-R synchromesh mechanism 21 is provided on the counter shaft 10 between the first output gear 14 and the reverse output gear 16. The 1-R synchromesh mechanism 21 operates by shifting a coupling sleeve 21a along an axial direction to be operatively coupled to the appropriate output gear.

That is, when the coupling sleeve 21a is moved rightward from the neutral position shown in FIG. 2 to mesh with a first clutch gear 21b, because the first output gear 14 is operatively coupled to the first clutch gear 21b and the counter shaft 10, it is possible to provide a first gear ratio.

Further, when the coupling sleeve 21a is moved leftward from the neutral position shown in FIG. 2 to mesh with a reverse clutch gear 21c, because the reverse output gear 16 is operatively coupled to the reverse clutch gear 21c and the counter shaft, it is possible to provide a reverse gear operation.

Also, a 3-5 synchromesh mechanism 22 is provided on the rearward end portion 4a of the first input shaft 4 between the third input gear 19 and the output gear 12. The 3-5 synchromesh mechanism 22 operates as follows by shifting a coupling sleeve 22a along an axial direction to be operatively coupled to the appropriate gear.

That is, when the coupling sleeve 22a is moved rightward from the neutral position shown in FIG. 2 to mesh with a third clutch gear 22b, because a third input gear 19 is operatively coupled to the third clutch gear 22b and the first input shaft 4, it is possible to provide a third gear ratio.

Further, when the coupling sleeve 22a is moved leftward from the neutral position shown in FIG. 2 to mesh with a fifth clutch gear 22c, because the first input shaft 4 (the rearward end portion 4a) is directly coupled to the output gear 12 (and thus the output shaft 6), it is possible to provide a fifth gear ratio.

Gear sets of the even numbered gear position groups (second gear, fourth gear and sixth gear) are arranged between the hollow second input shaft 5 and the counter shaft 10 in the order of the sixth gear set G6, the second gear set G2 and the fourth gear set G4 from a front side closer to the engine 1 to a rear side closer to the output shaft 6.

The sixth gear set G6 is arranged at a frontward end of the second input shaft 5 adjacent a frontward wall 7b of the transmission case 7. The fourth gear set G4 is arranged at a rearward end of the second input shaft 5. The second gear set G2 is arranged at an intermediate position between both ends of the second input shaft 5.

The sixth gear set G6 includes a sixth input gear 23 integrally formed on an outer periphery of the second input shaft 5 and a sixth output gear 24 rotatably installed on the counter shaft 10. The sixth input gear 23 and the sixth output gear 24 are complementarily arranged within the transmission case 7 so as to be intermeshed with each other.

The second gear set G2 includes a second input gear 25 integrally formed on the outer periphery of the second input shaft 5 and a second output gear 26 rotatably installed on the counter shaft 10. The second input gear 25 and the second output gear 26 are complimentarily arranged within the transmission case 7 so as to be intermeshed with each other.

The fourth gear set G4 includes a fourth input gear 27 integrally formed on the outer periphery of the second input shaft 5 and a fourth output gear 28 rotatably installed on the counter shaft 10. The fourth input gear 27 and the fourth output gear 28 are complementarily arranged within the transmission case 7 so as to be intermeshed with each other.

A 6-N synchromesh mechanism 29 is arranged in the counter shaft between the sixth output gear 24 and the second output gear 26. The synchromesh mechanism 29 operates as follows by shifting a coupling sleeve 29a along an axial direction to be operatively coupled to the sixth output gear 24 when appropriate.

That is, when the coupling sleeve 29a is moved rightward from the neutral position shown in FIG. 2 to mesh with a sixth clutch gear 29b, because the sixth output gear 24 is operatively coupled to the sixth clutch gear 29b and the counter shaft 10, it is possible to provide a sixth gear ratio.

Further, a 2-4 synchromesh mechanism 30 is arranged in the counter shaft 10 between the second output gear 26 and the fourth output gear 28. The synchromesh mechanism 30 operates by shifting a coupling sleeve 30a along an axial direction to be operatively coupled to the appropriate gear.

That is, when the coupling sleeve 30a is moved rightward from the neutral position shown in FIG. 2 to mesh with a second clutch gear 30b, because the second output gear 26 is operatively coupled to the second clutch gear 30b and the counter shaft 10, it is possible to provide a second gear ratio.

Also, when the coupling sleeve 30a is moved leftward opposite from the neutral position shown in FIG. 2 to mesh with a fourth clutch gear 30c, because the fourth output gear 28 is operatively coupled to the fourth clutch gear 30c and the counter shaft 10, it is possible to provide a fourth gear ratio.

The shifting operations of the twin-clutch manual transmission will be explained below.

In non-driving ranges such as a neutral range N or parking range P not requiring any power transfer, both sides of the normal open-type clutches (automated wet rotary clutches) C1 and C2 are disengaged the coupling sleeves 21a, 22a, 29a and 30a of the synchromesh mechanisms 21, 22, 29 and 30 are in the neutral position shown in FIG. 2. This is so that the twin-clutch manual transmission becomes a neutral state wherein power is not transferred.

In driving ranges such as a range D requiring an forward power transfer or a range R requiring a reverse power transfer, each of the forward gear position and the reverse gear position may be provided by controlling the coupling sleeves 21a, 22a, 29a and 30a of the synchromesh mechanisms 21, 22, 29 and 30 and the wet rotary clutches C1 and C2, while adopting the hydraulic oil from the oil pump 9 as the medium as explained below.

Further, it is required to cool and prevent abrasion of the wet rotary clutches C1 and C2 for a slip engagement executed to reduce shift shock at the time of undertaking an initial movement such as the first gear or reverse gear position, or for a slip engagement executed to control a clutch during shifting of the gears. Thus, the hydraulic oil is supplied as the lubricating oil from the oil pump 9 to the wet rotary clutches C1 and C2 in both the non-driving and driving ranges as indicated by the arrow α. By doing so, the wet rotary clutches C1 and C2 are sufficiently cooled and protected from abrasion, especially during the engagement transition period.

When a driver selects from the non-driving ranges such as the neutral range N or parking range P to the forward driving range such as the range D, the wet rotary clutches C1 and C2, which have been disengaged in the non-driving ranges, remain in the disengagement state. Further, a first gear pre-shift and a second gear pre-shift as indicated in Section "gear position=first gear" of FIG. 3(a) are executed as explained below. The pre-shift is to prepare for an initial movement or shifting operation after engaging the clutch by providing any one of the gear positions by intermeshing the appropriate synchromesh mechanisms while the corresponding wet rotary clutch is being disengaged.

That is, because the coupling sleeve 21a of the synchromesh mechanism 21 is moved rightward from the neutral position shown in FIG. 2, the synchromesh mechanism 21 executes the meshing operation wherein the first output gear 14 is operatively coupled to the counter shaft 10 while the rotary synchronizing operation is executed. By doing so, the pre-shift to the first gear (hereinafter, the meshing operation of the synchromesh mechanism 21 to the first gear executed for this pre-shift is referred to as a meshing operation A for a range D-selection of the synchromesh mechanism). Further, because the coupling sleeve 30a of the synchromesh mechanism 30 is moved rightward from the neutral mode shown in FIG. 2, the synchromesh mechanism 30 executes the meshing operation wherein the gear 26 is operatively coupled to the counter shaft 10 under the rotary synchronizing operation. By doing so, the pre-shift to the second gear of the even numbered gear position groups is executed (hereinafter, the meshing operation of the synchromesh mechanism 30 to the second gear executed for this pre-shift is referred to as a meshing operation A for a D-selection of the synchromesh mechanism).

However, although such selecting operation is executed from the non-driving ranges such as the neutral range N or parking range P to the forward driving range such as the range D, the wet rotary clutches C1 and C2 are maintained in the above disengagement state while the driver does not execute the initial movement operation such as pressing an accelerator.

As such, although the pre-shifts to the first gear and to the second gear are executed, a stopping state may be maintained because the wet rotary clutches C1 and C2 are disengaged so that a rotation of the engine 1 is not transferred to the output shaft 6 via a first gear line or a second gear line.

When the driver executes the initial movement operation such as pressing the accelerator, as indicated by "O" in Section "gear position=first gear" of FIG. 3(a), the automated wet rotary clutch C1 of the automated wet rotary clutches C1 and C2 in the disengagement state becomes engaged. The automated wet rotary clutch C1 is connected to the first gear via the first input shaft 4 to transfer power from the engine 1 corresponding to the initial movement operation such as pressing the accelerator.

By doing so, the power transfer in the first gear may be executed because the rotation of the engine 1 is output along the axial direction from the clutch C1 via the first gear set G1, the counter shaft 10 and the output gear sets 11 and 12 to the output shaft 6.

Also, it is apparent that at the time of executing this initial movement operation, a slip-engagement progress of the clutch C1 is controlled to allow for a smooth forward initial movement operation without a resulting shift shock.

When an upshift operation from the first gear to the second gear is executed, as indicated by an arrow from Section "gear position=first gear" to "gear position=second gear" of FIG. 3(a), the clutch C1 in the engagement state is disengaged and the clutch C2 becomes engaged (by a slip engagement process). By doing so, the switching operation from the first gear line to the second gear line (i.e., upshift operation from the first gear to the second gear) is executed after the pre-shift to the second gear was executed as above at the time of the selecting operation from the non-driving range to the driving range.

As such, the power transfer in the second gear may be executed because the rotation of the engine 1 is output along the axial direction from the clutch C2 via the second input shaft 5, the second gear set G2, the counter shaft 10, and the output gear sets 11 and 12 to the output shaft 6.

Further, when the clutch C1 is disengaged while the second gear is being provided as above, as indicated in Sections "gear position=second gear" and "gear position=third gear" of FIG. 3(a), a 1→3 pre-shift is executed as follows.

That is, the synchromesh mechanism 21 executes a releasing operation to separate the first output gear 14 from the counter shaft 10 by returning the coupling sleeve 21a of the synchromesh mechanism 21 to the neutral position. Further, because the synchromesh mechanism 22 executes the meshing operation for operatively coupling the third output gear 19 to the counter shaft 10 by moving the coupling sleeve 22a of the synchromesh mechanism 22 rightward from the neutral position while the rotary synchronizing operation is executed, the pre-shift to the third gear is executed (hereinafter, the meshing operation of the synchromesh mechanism 22 executed for this pre-shift operation is referred to as a meshing operation B of the synchromesh mechanism for shifting operation). By doing so, the 1→3 pre-shift is executed.

When an upshift operation from the second gear to the third gear is executed, as indicated by an arrow from Section "gear position=second gear" to "gear position=third gear" of FIG. 3(a), the clutch C2 in the engagement state is disengaged and the clutch C1 becomes engaged (by a slip engagement process). By doing so, the switching operation from the second gear line to the third gear line (i.e., upshift operation from the second gear to the third gear) is executed after the 1→3 pre-shift was executed as above while the second gear is being utilized.

As such, the power transfer in the third gear may be executed because the rotation of the engine 1 is output along the axial direction from the clutch C1 via the first input shaft 4, the third gear set G3, the counter shaft 10, and the output gear sets 11 and 12 to the output shaft 6.

Further, when the clutch C2 is disengaged while the third gear is being utilized as above, as indicated in Sections "gear position=third gear" and "gear position=fourth gear" of FIG. 3(a), a 2→4 pre-shift is executed as follows.

That is, the synchromesh mechanism 30 executes a releasing operation for separating the second output gear 26 from the counter shaft 10 by returning the coupling sleeve 30a of the synchromesh mechanism 30 to the neutral position. Further, because the synchromesh mechanism 30 executes the meshing operation for operatively coupling the fourth output gear 28 to the counter shaft 10 by moving the coupling sleeve 30a of the synchromesh mechanism 30 leftward from the neutral position while the rotary synchronizing operation is executed, the pre-shift to the fourth gear is executed (hereinafter, the meshing operation of the synchromesh mechanism 30 executed for this pre-shift operation is referred to as a meshing operation B of the synchromesh mechanism for shifting operation). By doing so, the 2→4 pre-shift is executed.

When an upshift operation from the third gear to the fourth gear is executed, as indicated by an arrow from Section "gear position=third gear" to "gear position=fourth gear" of FIG. 3(a), the clutch C1 in the engagement state is disengaged and the clutch C2 becomes engaged (by a slip engagement process). By doing so, the switching operation from the third gear line to the fourth gear line (i.e., upshift operation from the third gear to the fourth gear) is executed after the 2→4 pre-shift executed as above while the third gear is being utilized.

As such, the power transfer in the fourth gear may be executed because the rotation of the engine 1 is output along the axial direction from the clutch C2 via the second input shaft 5, the fourth gear set G4, the counter shaft 10 and the output gear sets 11 and 12 to the output shaft 6.

Further, when the clutch C1 is disengaged while the fourth gear is being utilized as above, as indicated in Sections "gear position=fourth gear' and "gear position=fifth gear" of FIG. 3(a), a 3→5 pre-shift is executed as follows.

That is, the synchromesh mechanism 22 executes a releasing operation for separating the third output gear 19 from the first input shaft 4 by returning the coupling sleeve 22a of the synchromesh mechanism 22 to the neutral position. Further, because the synchromesh mechanism 22 executes the meshing operation for directly coupling the first input shaft 4 to the output shaft 6 while the rotary synchronizing operation is executed by moving the coupling sleeve 22a of the synchromesh mechanism 22 leftward from the neutral position, the pre-shift to the fifth gear is executed (hereinafter, the meshing operation of the synchromesh mechanism 22 executed for this pre-shift operation is referred to as a meshing operation B of the synchromesh mechanism for shifting operation). By doing so, the 3→5 pre-shift is executed.

When an upshift operation from the fourth gear to the fifth gear is executed, as indicated by an arrow from Section "gear position=fourth gear" to "gear position=fifth gear" of FIG. 3(a), the clutch C2 in the engagement state is disengaged and the clutch C1 in the disengagement state is engaged (by a slip engagement process). By doing so, the switching operation from the fourth gear line to the fifth gear line (i.e., upshift operation from the fourth gear to the fifth gear) is executed after the 3→5 pre-shift executed as above while the fourth gear is being utilized.

As such, the power transfer in the fifth gear (the gear position is 1:1) may be executed because the rotation of the engine is outputted along the axial direction from the clutch C1 via the first input shaft 4 and the coupling sleeve 22a to the output shaft 6.

Further, when the clutch C2 is disengaged while the fifth gear is being utilized as above, as indicated in Sections "gear position=fifth gear' and "gear position=sixth gear" of FIG. 3(a), a 4→6 pre-shift is executed as follows.

That is, the synchromesh mechanism 30 executes a releasing operation for separating the fourth gear 28 from the counter shaft 10 by returning the coupling sleeve 30a of the synchromesh mechanism 30 to the neutral position. Further, because the synchromesh mechanism 29 executes the meshing operation for operatively coupling the sixth output gear 24 to the counter shaft 10 while the rotary synchronizing operation is executed by moving the coupling sleeve 29a of the synchromesh mechanism 29 rightward from the neutral position, the pre-shift to the sixth gear is executed (hereinafter, the meshing operation of the synchromesh mechanism 29 executed for this pre-shift operation is referred to as a meshing operation B of the synchromesh mechanism for shifting operation). By doing so, the 4→6 pre-shift is executed.

When an upshift operation from the fifth gear to the sixth gear is executed, as indicated by an arrow from Section "gear position=fifth gear" to "gear position=sixth gear" of FIG. 3(a), the clutch C1 in the engagement state is disengaged and the clutch C2 becomes engaged (by a slip engagement process). By doing so, the switching operation from the fifth gear line to the sixth gear line (i.e., upshift operation from the fifth gear to the sixth gear) is executed in addition to the 4→6 pre-shift executed as above while the fifth gear is being utilized.

As such, the power transfer in the sixth gear may be executed because the rotation of the engine 1 is output along the axial direction from the clutch C2 via the second input shaft 5, the sixth gear set G6, the counter shaft 10, and the output gear sets 11 and 12 to the output shaft 6.

While the fourth gear is being utilized as above, the 3→5 pre-shift state is executed as above. Further, while the sixth gear is being utilized, as indicated in Section "gear position=sixth gear" of FIG. 3(a), the fifth gear pre-shift state is maintained.

Further, when a downshift is sequentially executed from the sixth gear to the first gear, a reverse control opposite to the upshift is executed. This is so that, as shown in FIG. 3(b), a pre-shift sequence in a direction opposite pre-shift sequence described above and a predetermined sequential downshift may be executed by the engaging and disengaging control of the clutches C1 and C2.

When the vehicle is finally stopped via the sequential downshift processes, a pre-shift from the third gear to the first gear (forward gear position in the range D), as indicated in Sections "gear position=second gear" and "gear position=first gear" of FIG. 3(b), is executed (hereinafter, a meshing operation of the synchromesh mechanism 21 executed for this pre-shift operation is referred to as a meshing operation C of the synchromesh mechanism for stopping).

Also, when a vehicle speed decelerates to become a lower speed which requires the downshift from the second gear to the first gear, the clutch C2 disengages and the clutch C1 becomes engaged (by a slip engagement process), so the downshift to the first gear is executed.

The vehicle may be stopped by disengaging the wet rotary clutch C1 when the vehicle traveling in the first gear so that the vehicle speed is further decelerated and eventually stops the vehicle.

Then, when the range D (forward driving range) is switched to the non-driving range such as the neutral range N or parking range P, in addition to the disengagement of both of the wet rotary clutches C1 and C2, the coupling sleeves 21a, 22a, 29a and 30a of the synchromesh mechanism 21, 22, 29 and 30 are moved to or maintained in the neutral positions. As such, the twin-clutch manual transmission enters a neutral state wherein the power transfer is not executed.

When the non-driving range (such as the neutral range N or parking range P) is switched to the range R in order to allow driving in the reverse direction, because the synchromesh mechanism 21 executes the meshing operation for operatively coupling the reverse gear 16 to the counter shaft 10 while the rotary synchronizing operation is executed by moving the coupling sleeve 21a of the synchromesh mechanism 21 leftward from the neutral position, the pre-shift to the reverse gear position in the odd numbered gear position groups as indicated in Section "gear position=reverse" is executed (hereinafter, the meshing operation of the synchromesh mechanism 21 executed for this pre-shift operation to the reverse gear position is referred to as a meshing operation A of the synchromesh mechanism for selecting the range R).

Although the non-driving range such as the neutral range N or parking range P is switched to the reverse driving range such as the range R, the wet rotary clutches C1 and C2 remain disengaged even if the pre-shift to the reverse gear position is complete, while the driver does not execute the initial movement operation such as pressing the accelerator.

As such, although the pre-shift to the reverse gear position is complete, the rotation of the engine 1 is not transferred via the reverse gear line to the output shaft 6. Thus, the vehicle remains stopped.

When the driver executes the initial movement operation such as pressing the accelerator at this stage, which is indicated by "O" in Section "gear position=reverse" of FIGS. 3(a) and (b), the automated wet rotary clutch C1 of the automated wet rotary clutches C1 and C2 in the disengagement state is engaged. The automated wet rotary clutch C1 is connected to the reverse gear via the first input shaft 4 to transfer power from engine 1 corresponding to the output shaft 6 to move the vehicle in the reverse driving direction.

As such, the rotation of the engine from the clutch C1 is outputted from the output shaft 6 along the axial direction via the first input shaft 4, the reverse gear set GR, the counter shaft 10, and the output gear sets 11 and 12. Further, because the rotational direction is reversed by the reverse gear set GR, the power transfer in the reverse gear position may be executed.

Also, at the time of executing this initial movement operation, it is apparent that a slip-engagement progress of the clutch C1 is controlled, thereby executing a smooth reverse initial movement operation without a resulting shift shock.

The cooling and protection from abrasion of the wet rotary clutches C1 and C2 by the lubricating oil indicated by the arrow α in FIG. 2 will be explained.

To cool and prevent abrasion of the wet rotary clutches C1 and C2, an amount of the lubricating oil is supplied to the wet rotary clutches C1 and C2 as follows.

Because a heating amount of the clutches is great and the abrasion thereof becomes worse when the wet rotary clutches C1 and C2 are in a slip state in the driving range such as the range D or range R, it is necessary to increase the amount of the lubricating oil supplied to the clutches C1 and C2.

On the contrary, because there is neither heating nor abrasion in the clutches when the wet rotary clutches C1 and C2 are not in the slip state in the same driving range, it is not necessary to supply the lubricating oil to the clutches C1 and C2. However, it is desirable to keep supplying a small amount of the lubricating oil in anticipation of future frequent slip states of the clutches C1 and C2, considering a rapid response of a large supply of the lubricating oil is required at the time of the corresponding slip.

When the small amount of the lubricating oil is supplied to the clutches C1 and C2 during the meshing operation of the synchromesh mechanism while the wet rotary clutches C1 and C2 are disengaged in the driving range (range D or range R), the lubricating oil remains between the clutch discs. Drag torque occurs in the clutches C1 and C2 due to the viscosity of the lubricating oil remaining, thereby making the meshing operation of the synchromesh mechanism difficult or incomplete, and the shifting operation becomes hindered. Thus, it is desirable to halt the supplying of the lubricating oil to the clutches C1 and C2.

In addition to the above, the initial movement and shifting operations may not be completed in the twin-clutch manual transmission by the slip-engagement control of the wet rotary clutches C1 and C2 if the meshing operation of the synchromesh mechanism is not completed. As such, the meshing operation of the synchromesh mechanism is never executed along with the slip-engagement process which causes the heating and abrasion of the wet rotary clutches C1 and C2.

Thus, while the synchromesh mechanism is executing the meshing operation, the wet rotary clutch does not slip, and thus does not generate the heating or cause abrasion. In this regard, the lubricating oil is not supplied to the wet rotary clutches C1 and C2, because the heating and abrasion of the clutches are not caused during the meshing operation.

Further, because the wet rotary clutches C1 and C2 do not generate the slip accompanying the heating and abrasion in the non-driving range (range N and range P), the heating and abrasion of the clutches are not caused.

Although the lubricating oil is not supplied between the clutch discs, the lubricating oil remains between the clutch discs. As such, time is required to remove the lubricating oil by the centrifugal force exerted upon the remaining lubricating oil by the rotation of the wet rotary clutches C1 and C2 until the remaining lubricating oil is completely removed from between the clutch discs.

The meshing operation A of the synchromesh mechanism is executed when selecting the range D or R for initial movement of the vehicle from a non-driving range N or P. The meshing operation B for shifting and the meshing operation C for stopping are executed during driving of the vehicle.

During such driving, because the revolution of the wet rotary clutches C1 and C2 is high, the centrifugal force exerted upon the remaining lubricating oil is great. Thus, when the lubricating oil is not supplied between the clutch discs, the remaining lubricating oil between the clutch discs is rapidly scattered and removed, so there is no problem caused by the drag torque of the clutches during the meshing operations B and C.

However, because the meshing operation A of the synchromesh mechanism for selecting the range D or R is executed while the accelerator pedal is released, the revolution of the wet rotary clutches C1 and C2 is low, typically at an engine idling speed. Further, because the rotation of the wet rotary clutches C1 and C2 is so low, the centrifugal force exerted upon the remaining lubricating oil is small.

As such, although the lubricating oil is not being supplied between the clutch discs, the time for removing the lubricating oil thereafter becomes longer, so the lubricating oil remains between the clutch discs for a considerable time after supplying of the lubricating oil ceases.

Further, because the remaining lubricating oil causes the drag torque to occur in the wet rotary clutches C1 and C2, the meshing operation of the synchromesh mechanism becomes difficult or incomplete. Thus, the shifting operation is hindered.

Figure 4:
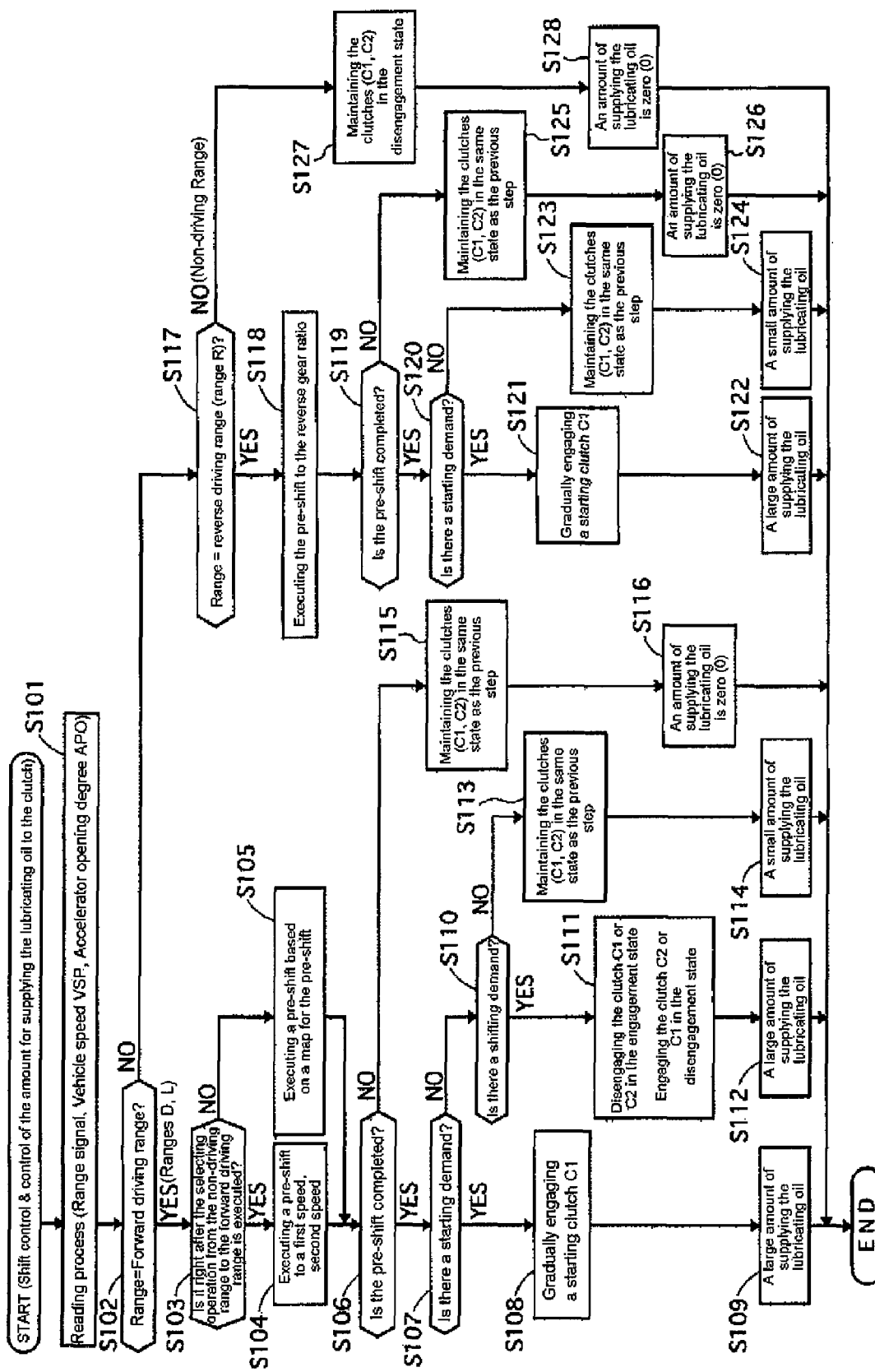
FIG. 4 is a flow chart showing a control program related to a shift control of the twin-clutch manual transmission of FIG. 1 as well as showing the control of an amount of lubricating oil supplied to the clutch.
Figure 5:
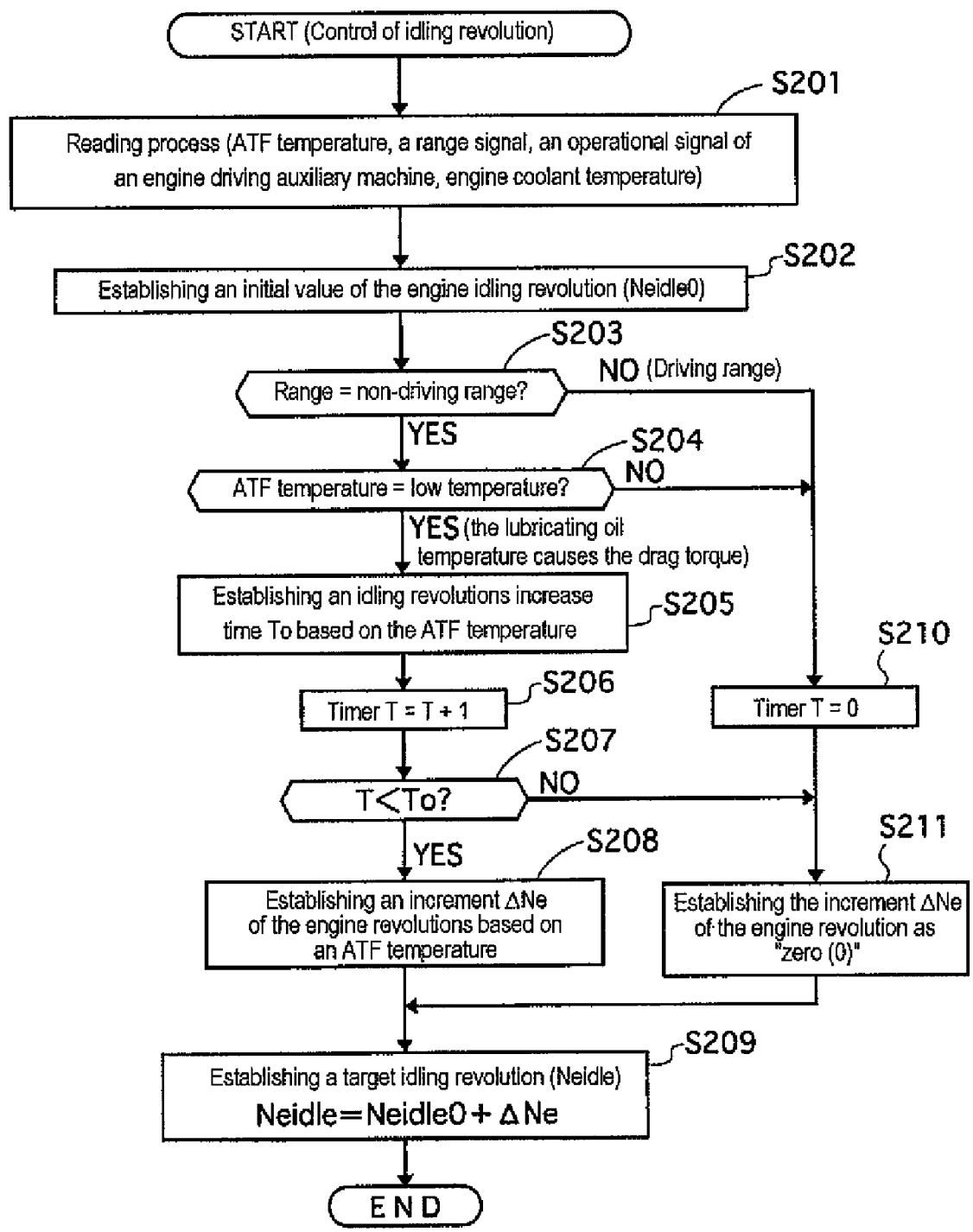
FIG. 5 is a flow chart showing a control program of an engine idling revolutions control.

In order to resolve such problem, when considering the above circumstances, the drag torque reduction control of the wet rotary clutches C1 and C2 is executed in the present embodiment as shown in the time charts of FIGS. 6 to 13 according to a control program shown in FIGS. 4 and 5. According to the drag torque reduction control, the clutch is cooled and protected from abrasion by supplying the lubricating oil as indicated by the arrow α.

Further, the engagement and disengagement of the wet rotary clutches C1 and C2 are executed by a first clutch actuator 41 and a second clutch actuator 42. Also, among the coupling sleeves 21a, 22a, 29a and 30a for constituting the synchromesh mechanisms 21, 22, 29 and 30, strokes of the coupling sleeves 21a and 22a for the odd numbered gear positions are executed by an odd numbered step shift actuator 43 in FIG. 1. Also, strokes of the coupling sleeves 29a and 30a for the even numbered gear positions are executed by an even numbered step shift actuator 44 shown in FIG. 1. The amount of the lubricating oil supplied to the wet rotary clutches C1 and C2 is controlled by a lubricating oil control valve 45 shown in FIG. 1.

The shifting operation of the twin-clutch manual transmission 2 is controlled by a transmission controller 46 via the clutch actuators 41 and 42, the shift actuators 43 and 44 and the lubricating oil control valve 45. A vehicle speed signal from a vehicle speed sensor 47 for detecting the vehicle speed VSP, a transmission range signal (selected range signal) from a shift lever 48 operated by the driver for selecting the ranges P, R, N and D and a lubricating oil temperature signal from a temperature sensor 49 for detecting a temperature ATF of the lubricating oil are inputted into the transmission controller 46.

An engine controller 50 executes a fuel injecting amount control via an injector 51 and a suctioning amount control via a throttle valve 52 so that the engine 1 determines the output. A signal from an engine rotation sensor 53 for detecting engine revolutions Ne, a signal from an accelerator opening degree sensor 54 for detecting an accelerator pressing amount (accelerator opening degree) APO and a signal from a throttle opening degree sensor 55 for detecting a throttle opening degree TVO of the throttle valve 52 are inputted into the engine controller 50. Further, a signal from an engine coolant temperature sensor 56 for detecting an engine coolant temperature Tw and an auxiliary device operating sensor from an auxiliary device driving sensor 57 for detecting an operational state of the auxiliary device are inputted.

Also, a mutual communication circuit 58 is provided between the engine controller 50 and the transmission controller 46 so that an input signal is inputted into both controllers to exchange information so as to be used for each control.

FIG. 4 shows a control program related to the shift control of the twin-clutch manual transmission 2, the engagement ON and disengagement OFF of the wet rotary clutches C1 and C2, and the control of the amount of the lubricating oil supplied to the clutches C1 and C2. The control program is started when an ignition switch is switched ON.

First, in Step S101, a range signal related to the present selected signal, the vehicle speed signal related to the vehicle speed VSP and the accelerator opening degree signal related to the accelerator opening degree APO are read.

In Step S102 and Step S117, it is checked whether the present selected range is the forward driving range (range D for forward gear position or range L for braking the engine) or the reverse driving range (range R), respectively.

If it is determined in S102 that the forward driving range is being selected, then the control proceeds to Step S103 to switch to the shift control for the forward driving range and begin a lubricating oil determination loop.

If it is determined in S102 that the forward driving range is not being selected the control proceeds to S117 when it is determined that the reverse driving range is being selected, then the control proceeds to Step S118 to switch to the shift control for the reverse driving range and begin the lubricating oil determination loop.

If it is determined in S102 that the forward driving range is not being selected and it is determined in S117 that the reverse driving range is not being selected, that is, if it is determined that the non-driving range (range P for parking or range N for stopping) is being selected, the control proceeds to Step S127 to switch to the shift control for the non-driving range and begin the lubricating oil determination loop.

Because the non-driving range is being selected in S127, both clutches C1 and C2 are disengaged as described above. Further, because the clutches C1 and C2 remain disengaged in Step S128, the cooling and the protection from abrasion are not necessary. Thus, the amount of the lubricating oil supplied α (see FIG. 2) to the clutches C1 and C2 is established to be zero (0).

Also, because there is no pre-shift in the loop corresponding to the non-driving range, all synchromesh mechanisms 21, 22, 29, and 30 are maintained in the neutral modes to thereby maintain the stopping state in the non-driving range.

If it is determined in S102 that the forward driving range is being selected, it is checked in S103 whether or not it is right after the switching from the non-driving range to this forward driving range was executed.

If it is right after the selecting operation from the non-driving range to the forward driving range was executed, the pre-shift to the first gear in the odd numbered gear position groups (the meshing operation of the synchromesh mechanism 21) and the pre-shift to the second gear in the even numbered gear position groups (the meshing operation of the synchromesh mechanism 30), which should be executed after this selecting operation, are executed in Step S104.

Also, the term "pre-shift (meshing operation of the synchromesh mechanism)" herein indicates an actual operation itself, not a command signal.

If it is determined in S103 that it is not right after the selecting operation from the non-driving range to the forward driving range is executed, the appropriate pre-shift (meshing operation and separating operation of the corresponding synchromesh mechanism), from FIGS. 3(a) and (b), is executed in Step S105.

It is checked in Step S106 whether or not the pre-shift in S104 or S105 is completed. If the pre-shift has not been completed, then the control proceeds to Step S115.

Patterns wherein the control proceeds to S115 includes a first pattern via S104 and S106 to S115 and a second pattern via S105 and S106 to S115 according to a result of the determination in S103 whether or not it is right after the selecting operation from the non-driving range to the forward driving range is executed (in the flow chart of FIG. 4, both patterns indicate the same S106 and S115 for convenience).

According to the first pattern, because the pre-shift to the first gear and the pre-shift to the second gear executed in S104 are not completed (S106), and thus, a driveline is not established, both clutches C1 and C2 are disengaged.

According to the second pattern, because the pre-shift during the driving based on FIGS. 3(a) and (b), which begin execution in S105 when it is not right after the selecting operation is executed, is not completed (S106), one of the clutches C1 and C2 corresponding to the established gear position is disengaged and the other clutch becomes engaged.

The pre-shift is further operated in S115 by maintaining the clutches C1 and C2 in the same state as the previous step.

Then, in Step S116, the amount of the lubricating oil supplied to the clutches C1 and C2 is set to be zero (0) such that the pre-shift (the meshing operation of the synchromesh mechanism) is not hindered by the drag torque occurring in the clutches C1 and C2 in the disengagement state (according to the circumstances, such an amount is not always set to be zero (0) but may be a small amount).

When it is determined in S106 that the pre-shift is completed, it is checked in Step S107 whether or not there is a starting demand operation from the accelerator opening degree APO, and if there is no starting demand operation in S110 it is determined whether or not there is a shifting demand which occurs when a target gear ratio suitable for the present driving state (corresponding to the accelerator opening degree APO and the vehicle speed VSP) differs from the current gear ratio.

When it is determined in S107 that there is no starting demand operation and it is determined in S110 that there is no shifting demand, it is determined that both clutches C1 and C2 are in the non-slip state meaning the heating and abrasion will not be caused, and the control proceeds to Step S113.

Patterns wherein the control proceeds to S113 includes a first pattern via S104, S106, S107, and S110 to S113 and a second pattern via S105, S106, S107, and S110 to S113 according to a result of the determination in S103 whether or not it is right after the selecting operation from the non-driving range to the forward driving range is executed (in the flow chart of FIG. 4, both patterns indicate the same S106, S107, S110 and S113 for convenience).

According to the first pattern, although the pre-shift to the first gear and the pre-shift to the second gear executed in S104 responding to the above selecting operation are completed (S106), because there has been no starting demand yet (S107), the vehicle remains stopped by operating the brake. Thus, the clutches C1 and C2 are disengaged (only the clutch C1 is in a pre-charge state right before engaging to enter the first gear in anticipation of a starting response from the accelerator) and the clutches C1 and C2 are in the non-slip state so heating and abrasion are not caused.

According to the second pattern, although the pre-shift during the driving based on FIGS. 3(a) and (b), which is executed in S105 when it is not right after the selecting operation is executed, is completed (S106), because there has been no shifting demand (S110), one of the clutches C1 and C2 according to the established shift range is disengaged and the other clutch becomes engaged. Also, the clutches C1 and C2 are in the non-slip state so heating and abrasion are not caused.

In S113, responding to no starting demand (S107) and no shifting demand (S110), the clutches C1 and C2 are maintained in the same state as the previous step. In Step S114, the amount of the lubricating oil supplied to the clutches C1 and C2 is a small amount.

Here in S114, despite avoiding causing heating and abrasion because of the non-slip state in any one of the clutches C1 and C2, the amount of the lubricating oil supplied to the clutches C1 and C2 is the small amount for the reasons described below.

Specifically, if the amount of the lubricating oil supplied to the clutches C1 and C2 is set to be zero(0), because there is a significant response delay from a lubricating oil supply command to a point when the lubricating oil supply to the clutches C1 and C2 is actually started, a rapid response for a large amount of lubricating oil required at the time of the slip-engagement control of the clutches C1 and C2 may not be met.

Thus, the small amount of the lubricating oil supplied conforms to the above demand and is greater than the amount of the lubricating oil which does not hinder the meshing operation of the synchromesh mechanism.

Because the small amount of the lubricating oil is continuously supplied to the clutches C1 and C2 in Step S114 as above, the response delay from the lubricating oil supply command to the point when the lubricating oil supply to the clutches C1 and C2 is actually started becomes minimized. Further, the frequent and rapid response for a large amount of lubricating oil, which is required during driving, may be met sufficiently.

When it is determined in S107 that there is a starting demand operation after it is determined in S106 that the pre-shift is completed, the starting clutch C1 is gradually engaged in order to respond to such starting demand in Step S108. Then, the amount of the lubricating oil supplied to the clutch C1 in preparation for the heating and abrasion accompanied by the slip engagement of the clutch C1 becomes greater in Step S109.

Thus, the amount of the lubricating oil supplied here (large amount) refers to an amount capable of executing the preparation for the heating and abrasion accompanied by the slip engagement of the starting clutch C1, and is greater than the amount of the lubricating oil supplied which does not hinder the meshing operation of the synchromesh mechanism.

When it is determined in S110 that there is a shifting demand because a target gear ratio suitable for the present driving state differs from the current gear ratio, the control proceeds to Step S111.

In S111, the current gear ratio is changed to meet the target gear ratio. More specifically, the clutch C2 or C1 in the disengagement state is engaged while the other clutch C1 or C2 in the engagement state is being disengaged for the upshift or downshift for the corresponding shifting operation, and the shifting operation is executed by the a slip engagement process of the clutches C1 and C2.

Then, in Step S112, the amount of the lubricating oil supplied to the clutches C1 and C2 is increased in preparation for the heating and abrasion accompanied by the slip-engagement process at the time of switching the clutches C1 and C2.

Thus, the amount of the lubricating oil supplied here (large amount) refers to an amount capable of executing the preparation for the heating and abrasion accompanied by the slip engagement of the starting clutch C1, and is greater than the amount of the lubricating oil supplied which does not hinder the meshing operation of the synchromesh mechanism.

When it is determined in S117 that the reverse driving range is being selected, the pre-shift (the meshing operation of the synchromesh mechanism 21) to the reverse gear position in the odd numbered gear position groups, which should be executed at the time of selecting the corresponding reverse driving range, is executed in S118.

It is checked in Step S119 whether or not the pre-shift started in S118 is completed. If the pre-shift is not completed, then the control proceeds to Step S125.

According to a pattern wherein the control proceeds to S125, because the pre-shift to the reverse gear position executed in S118 responding to the selecting operation to the reverse driving range is not completed (S119), the driveline is not established. Thus, both clutches C1 and C2 are disengaged In S125, the pre-shift is further operated by maintaining the clutches C1 and C2 in the same state as the previous step.

Then, in Step S126, the amount of the lubricating oil supplied to the clutches C1 and C2 is set to be zero (0) such that the pre-shift (the meshing operation of the synchromesh mechanism 21) is not hindered by the drag torque occurring in the clutch C1 in the disengagement state (according to the circumstances, such an amount is not always set to be zero (0) but may be a small amount).

When it is determined in S119 that the pre-shift is completed, it is checked in S120 whether or not there is a starting demand operation from the accelerator opening degree APO.

When it is determined in S120 that there is no starting demand operation, that is, when it is determined that the clutches C1 and C2 are in the non-slip state so that heating and abrasion are not caused, the control proceeds to Step S123.

According to a pattern wherein the control proceeds to S123, although the pre-shift to the reverse gear position executed in S118 responding to the selecting operation to the reverse driving range is completed (S119), because there has been no starting demand yet (S120), the vehicle remains stopped by operating the brake. Thus, the clutches C1 and C2 are disengaged (only the clutch C1 is in a pre-charge state right before engaging to enter the reverse gear in anticipation of a starting response from the accelerator) and the clutches C1 and C2 are in the non-slip state so heating and abrasion are not caused.

In S123, because there is no starting demand, the clutches C1 and C2 are maintained in the same state as the previous step. In Step S124, the amount of the lubricating oil supplied to the clutches C1 and C2 is a small amount.

Here, although the clutches C1 and C2 are in the non-slip state so heating and abrasion are not caused, the reason for setting the amount of the lubricating oil supplied to the clutches C1 and C2 is the small amount for the reasons described below.

If the amount of the lubricating oil supplied to the clutches C1 and C2 is set to be zero (0), because there is a significant response delay from a lubricating oil supply command to a point when the lubricating oil supply to the clutches C1 and C2 is actually started, a rapid response for a large amount of lubricating oil required at the time of the slip-engagement control of the clutches C1 and C2 may not be met.

Thus, the amount of the lubricating oil supplied conforms to the above demand and is greater than the amount of the lubricating oil which does not hinder the meshing operation of the synchromesh mechanism.

Because the small amount of the lubricating oil is continuously supplied to the clutches C1 and C2 in Step S124 as above, the response delay from the lubricating oil supply command to the point when the lubricating oil supply to the clutches C1 and C2 is actually started becomes minimized. Further, the rapid response for a large amount of lubricating oil, which is required at the time of starting, may be met sufficiently.

When it is determined in S120 that there is a starting demand operation after it is determined in S119 that the pre-shift is completed, the starting clutch C1 is gradually engaged in order to respond to the starting demand in Step S121. Then, the amount of the lubricating oil supplied to the clutches C1 and C2 in preparation for the heating and abrasion accompanied by the slip engagement of the clutch C1 becomes greater in Step S122.

Thus, the amount of the lubricating oil supplied here (large amount) refers to an amount capable of executing the preparation for the heating and abrasion accompanied by the slip engagement of the clutch C1 and greater than the amount of the lubricating oil supplied which does not hinder the meshing operation of the synchromesh mechanism.

As mentioned above, according to the lubricating oil supply control in FIG. 4, the clutches C1 and C2 are in the slip state causing heating and abrasion at the time of driving in a forward gear (S107 and S108), shifting (S110 and S111) and driving in a reverse gear (S120 and S121). Thus, because the amount of the lubricating oil supplied to the clutches C1 and C2 is a greater amount in preparation for the heating and abrasion (S109, S112 and S112), so that the clutches C1 and C2 may be prevented from being heated or abraded due to the slip state.

Further, in a forward start-waiting state (S106, S107, S110 and S113) and reverse start-waiting state (S119, S120 and S123) after the pre-shift is completed or during the driving in the current gear ratio (S106, S107, S110 and S113), the clutches C1 and C2 are not in the slip state causing the heating or abrasion. However, upon considering the slip engagement of the clutches C1 and C2 at the time of starting thereafter and a shifting operation, the amount of the lubricating oil supplied to the clutches C1 and C2 is not zero (0), but the small amount of the lubricating oil is continuously supplied (S114 and S124). Thus, at the time of starting the slip engagement of the clutches C1 and C2, the rapid response of a large amount of lubricating oil supplied to the clutches C1 and C2 may be started. In this regard, the preparation of the clutches C1 and C2 for the heating and abrasion may be secured.

Also, because the amount of the lubricating oil supplied to the clutches C1 and C2 is set to be zero (0) (S116 and S125) while the pre-shift is executed, but before being completed (S106, S115, S119 and S125), the drag torque occurring in the clutches C1 and C2 due to the lubricating oil may be alleviated or prevented. Thus, the pre-shift will not be hindered by the drag torque.

Further, in the non-driving range (S102, S117 and S127), when considering that it is necessary to supply the lubricating oil to the clutches C1 and C2 due to the disengagement state of the clutches C1 and C2, the amount of the lubricating oil supplied to the clutches C1 and C2 is set to be zero (0) (S128). Thus, because unnecessary supply of lubricating oil to the clutches C1 and C2 in the non-driving range may be avoided, and energy loss may be decreased.

However, in the present embodiment, the amount of lubricating oil supplied is increased in S112 while it is being determined in S110 that there is a shifting demand, and if it is determined in S110 that there is no shifting demand, the amount of lubricating oil supplied is immediately reduced in S114. In such a case, there is the following concern.

That is, during the shifting operation, because the clutches generate a large amount of heat by the slip engagement process C1 and C2 executed in S111, if the amount of lubricating oil supplied is set to be the small amount at the same time of ending the shifting operation (S114) ends, a temperature increase of the clutches C1 and C2 due to the heating may cause a slight delay. Further, the temperature of the clutches C1 and C2 may temporarily become excessive.

In order to resolve such a problem, although it is determined in S110 that there is no shifting demand, it is preferable to maintain the large amount of the lubricating oil by executing S112 for a predetermined time and then reduce the amount of the lubricating oil by executing S114.

Further, as the amount of the lubricating oil supplied, is controlled until the pre-shift is completed (S106, S115, S119 and S125), although the amount of the lubricating oil supplied to the clutches C1 and C2 is set to be zero (0) (S116 and S126), the drag torque occurs in the clutches C1 and C2 by the remaining lubricating oil may not be securely alleviated for the reason stated below. Thus, the pre-shift may be hindered by the drag torque.

That is, although the amount of the lubricating oil supplied to the clutches C1 and C2 is set to be zero (0) and the lubricating oil is not supplied between the clutch discs in S116 and S126, because the lubricating oil remains between the clutch discs, time is required to remove the lubricating oil according to the centrifugal force exerted upon the remaining lubricating oil by the rotation of the clutches C1 and C2 until the remaining lubricating oil is thoroughly removed.

The time required for removing the remaining lubricating oil will be explained below.

The control for providing the amount of the lubricating oil supplied is zero (0) when the control proceeds via S103, S105, S106, S115 to S116 to prevent the drag torque so that the meshing operation (pre-shift) of the synchromesh mechanism for the shifting operation is not hindered. Such a control is executed while the vehicle is traveling.

While the vehicle is traveling, because the revolutions of the wet rotary clutches C1 and C2 is high, the centrifugal force exerted upon the remaining lubricating oil is great. Further, because the amount of the lubricating oil supplied to the wet rotary clutches C1 and C2 is set to be zero (0), the remaining lubricating oil between the clutch discs may be rapidly removed toward an outer side along a diametrical direction after supply of the lubricating oil between the clutch discs ceases. Thus, the problem caused by the drag torque of the clutches C1 and C2 may be resolved only by the control of the amount of the lubricating oil supplied in S116.

However, the control of the amount of the lubricating oil supplied when the control proceeds via S103, S104, S106, S115 to S116 or the control for providing the amount of the lubricating oil supplied when the control proceeds via S117, S118, S119, S125 to S126 is to prevent the drag torque from occurring to avoid hindering the meshing operation (pre-shift) of the synchromesh mechanism for selecting the range D or R executed at the time of the selecting operation to the forward driving range or reverse driving range. Such a control is executed while the vehicle is stopped and the accelerator pedal is released.

While the vehicle is stopped and the accelerator pedal is released as above, because the revolutions of the wet rotary clutches C1 and C2 is low due to the engine idling revolutions, the centrifugal force exerted upon the remaining lubricating oil is small.

As such, more time is required for removing the remaining lubricating oil after supply of the lubricating oil between the clutch discs ceases by setting the amount of the lubricating oil supplied to the wet rotary clutches C1 and C2 to be zero (0). Thus, the lubricating oil remains between the clutch discs for a considerable time after supply of the lubricating oil between the clutch discs ceases.

Further, because the drag torque occurs in the wet rotary clutches C1 and C2 because of the remaining lubricating oil, the meshing operation (pre-shift at the time of selecting the range D or R) of the synchromesh mechanism becomes difficult or incomplete. Thus, the shifting operation is hindered.

In order to resolve such problem, in the present embodiment, the engine idling revolutions, which are the revolutions at the input of the wet rotary clutches C1 and C2, is increased as shown in the time charts of FIGS. 6 to 13 according to a control program of FIG. 5.

The control program of FIG. 5 is started when the ignition switch is switched ON.

First, in Step S201, the lubricating oil temperature (ATF temperature) of the twin-clutch manual transmission, a range signal related to the present selected range, an operational signal of an engine driving auxiliary device (such as a compressor for an air controller, a water pump, or a generator), and the engine coolant temperature signal are read.

Then, in Step S202, an initial value Neidle0 of the engine idling revolutions, which becomes a basic value, is established while considering an operational state of the engine driving auxiliary device or the engine coolant temperature in a conventional manner.

It is checked in Step S203 whether the present selected range is the non-driving range or driving range. Further, it is checked in Step S204 whether or not the lubricating oil temperature is a low temperature that is lower than a predetermined temperature value.

Such a predetermined temperature value corresponds to a minimum value temperature below which the drag torque occurs in the clutches C1 and C2 which hinders the meshing operation of the synchromesh mechanism.

Thus, when it is determined in S204 that the lubricating oil temperature is lower than the predetermined temperature value, it is determined that the drag torque will occur in the clutches C1 and C2 which hinders the meshing operation of the synchromesh mechanism.

When it is determined in S203 that the present selected range is the driving range, because it is unnecessary to increase the engine idling revolutions for enhancing a scatter of the remaining lubricating oil, the control sequentially proceeds to Step S210, Step S211 and Step S209.

Further, when it is determined in S204 that the lubricating oil temperature is a high enough temperature so as not to cause the drag torque for hindering the meshing operation of the synchromesh mechanism, it is unnecessary to increase the engine idling revolutions for enhancing the scatter of the remaining lubricating oil, so the control sequentially proceeds to S210, S211 and S209.

By doing so, deterioration of fuel efficiency resulting from the unnecessary engine idling revolutions increase control may be avoided.

In S210, a timer T is reset as zero (0). The timer T measures the time elapsed from when the control to increase the engine idling revolutions is started.

In S211, an increment $\Delta Ne$ of the engine idling revolutions is provided as zero (0). The increment $\Delta Ne$ measures the increase of the engine idling revolutions required to scatter the remaining lubricant oil.

In S209, a target idling revolutions Neidle is set with a value of adding the initial value Neidle0 of the engine idling revolutions set in S202, to the increment $\Delta Ne$ of the engine idling revolutions set in S211 ($\Delta Ne=0$).

Thus, in such a case, because the target idling revolutions Neidle becomes equal to the initial value Neidle0, the control to increase the engine idling revolutions for scattering the remaining lubricating oil is not executed.

When it is determined in S203 that the present selected range is the non-driving range and it is determined in S204 that the lubricating oil temperature is the low temperature which causes the drag torque for hindering the meshing operation of the synchromesh mechanism, because it is necessary to increase the engine idling revolutions for enhancing the scatter of the remaining lubricating oil, the control proceeds to S205.

In S205, an engine idling revolutions increase time To required for scattering the remaining lubricating oil is set.

Because such engine idling revolutions increase time To is set to be longer as the lubricating oil temperature is lower, the remaining lubricating oil may be securely scattered under any lower temperature (high viscosity).

Then, in Step S206, the timer T for measuring the time elapsed from when this step is selected is incremented and the engine idling revolutions increase control duration after the engine idling revolutions increase control is started may be monitored by the timer T.

It is determined in Step S207 whether or not the measured time of the timer T (the engine idling revolutions increase control duration) is less than the engine idling revolutions increase time To set in S205. That is, it is checked whether or not the measured time of the timer T is a time before the engine idling revolutions increase time To is elapsed after the engine idling revolutions increase control is started.

Because it is natural that T<To at first, the control proceeds to Step S208. In S208, the engine idling revolutions increment $\Delta Ne$ required for scattering the remaining lubricating oil is set according to the lubricating oil temperature.

Because such an engine idling revolutions increment $\Delta Ne$ is set to be greater as the lubricating temperature is lower, the remaining lubricating oil may be securely scattered under any lower temperature (high viscosity).

Further, the multiplication of the engine idling revolutions increment $\Delta Ne$ and the engine idling revolutions increase time To provides an amount of energy required for scattering the remaining lubricating oil. Although one of the engine idling revolutions increment ΔNe and the engine idling revolutions increase time To is provided lower and another is provided greater, the remaining lubricating oil may be securely scattered in a predetermined speed.

Then, the control proceeds to Step S209. In S209, a target idling revolutions Neidle is established with Neidle0+ΔNe obtained by adding the engine idling revolutions increment ΔNe corresponding to the lubricating oil temperature established in S208 to the initial value Neidle0 of the engine idling revolutions established in S202, which becomes the basic value. Further, the engine idling revolutions increase control for scattering the remaining lubricating oil is executed by the target idling revolutions Neidle.

When it is determined in S207 that the measured time of the timer T (the engine idling revolutions increase control duration) becomes the engine idling revolutions increase time To, that is, when the engine idling revolutions increase time To is elapsed after the engine idling revolutions increase control is started, the control is switched to a loop via S211 leading to S209. Thus, the engine idling revolutions increase control for scattering the remaining lubricating oil is ended.

According to the engine idling revolutions increase control in FIG. 5, before the meshing operation of the synchromesh mechanism for the pre-shift accompanied with the selecting operation to the forward driving range or reverse driving range is started and from when the non-driving range is selected, the engine idling revolutions during the engine idling revolutions increase time To is increased to a value higher than the initial value Neidle0 by ΔNe. Thus, the remaining lubricating oil in the clutches C1 and C2 wherein the supply of the lubricating oil is stopped may be thoroughly and rapidly scattered by a great centrifugal force even during the engine idling operation in the stopping state.

In this regard, the drag torque does not occur in the clutches C1 and C2 by the remaining lubricating oil. The problem that the meshing operation of the synchromesh mechanism for the pre-shift accompanied with the selecting operation to the forward driving range or reverse driving range becomes difficult or incomplete may be resolved.

Further, because the engine idling revolutions increase time To becomes longer as the lubricating oil temperature is a lower temperature, the engine idling revolutions increment ΔNe becomes greater as the lubricating oil temperature is a lower temperature. Thus, the desired scattering effect may be thoroughly achieved under any lubricating oil temperature with a desired minimum idling revolutions increase control.

Also, when the engine idling revolutions increase control for enhancing the scatter of the remaining lubricating oil is executed before the meshing operation of the synchromesh mechanism for the pre-shift accompanied with the selecting operation to the forward driving range or reverse driving range, the corresponding engine idling revolutions increase control is started at the time of switching ON the ignition switch for starting the control program in FIG. 5 or selecting the non-driving range (S203). Thus, such operational effect may be achieved with low costs without any inconvenience of observing that the engine idling revolutions increase control is started.

Further, if the lubricating oil temperature is the high temperature without the drag torque for hindering the meshing operation of the synchromesh mechanism, the engine idling revolutions increase control for enhancing the scatter of the remaining lubricating oil is not executed. Thus, deterioration of fuel efficiency caused by the unnecessary engine idling revolutions increase control may be avoided.

Also, when the non-driving range is switched to the driving range even during the engine idling revolutions increase control, the control proceeds to S210 via S203. Thus, the engine idling revolutions increase control is ended. As such, the engagement of the clutch C1 accompanied by the range switch from the non-driving range to the driving range is not executed while in the engine idling revolutions increase state. Consequently, it may be avoided that a sudden start or shift shock occurs when the clutch C1 is engaged in the engine idling revolutions increase state.

However, although it is not explained in the lubricating oil supply amount control in FIG. 4, when it is determined in S204 of FIG. 5 that the lubricating oil temperature is the high temperature higher than the predetermined temperature value which hinders the meshing operation of the synchromesh mechanism, the engine idling revolutions increase control is ended as described with respect to FIG. 5 as well as the control for setting the amount of the lubricating oil supplied to be zero (0) in S116 and S126 of FIG. 4. By doing so, a lubricating defect of the clutches C1 and C2 generated by an unnecessary control for setting the amount of the lubricating oil supplied as zero (0) may be avoided.

Further, the engine idling revolutions increase control of FIG. 5 is executed in combination with the lubricating oil supply control of FIG. 4 (more specifically, the control for setting the amount of the lubricating oil supplied to be zero (0) in S116 and S126). However, the drag torque reduction effect may be achieved only by the engine idling revolutions increase control of FIG. 5 without the lubricating oil supply control of FIG. 4 (more specifically, the control for setting the amount of the lubricating oil supplied to be zero (0) in S116 and S126).

In such a case, it is apparently necessary to keep executing the engine idling revolutions increase control until the synchromesh mechanism ends the rotation meshing operation.

The lubricating oil supply reduction control of FIG. 4 and the engine idling revolutions increase of FIG. 5 will be explained below based on FIGS. 6 to 13 showing operational time charts for Scenes 1 to 8 requiring the drag torque reduction control.

Figure 6:
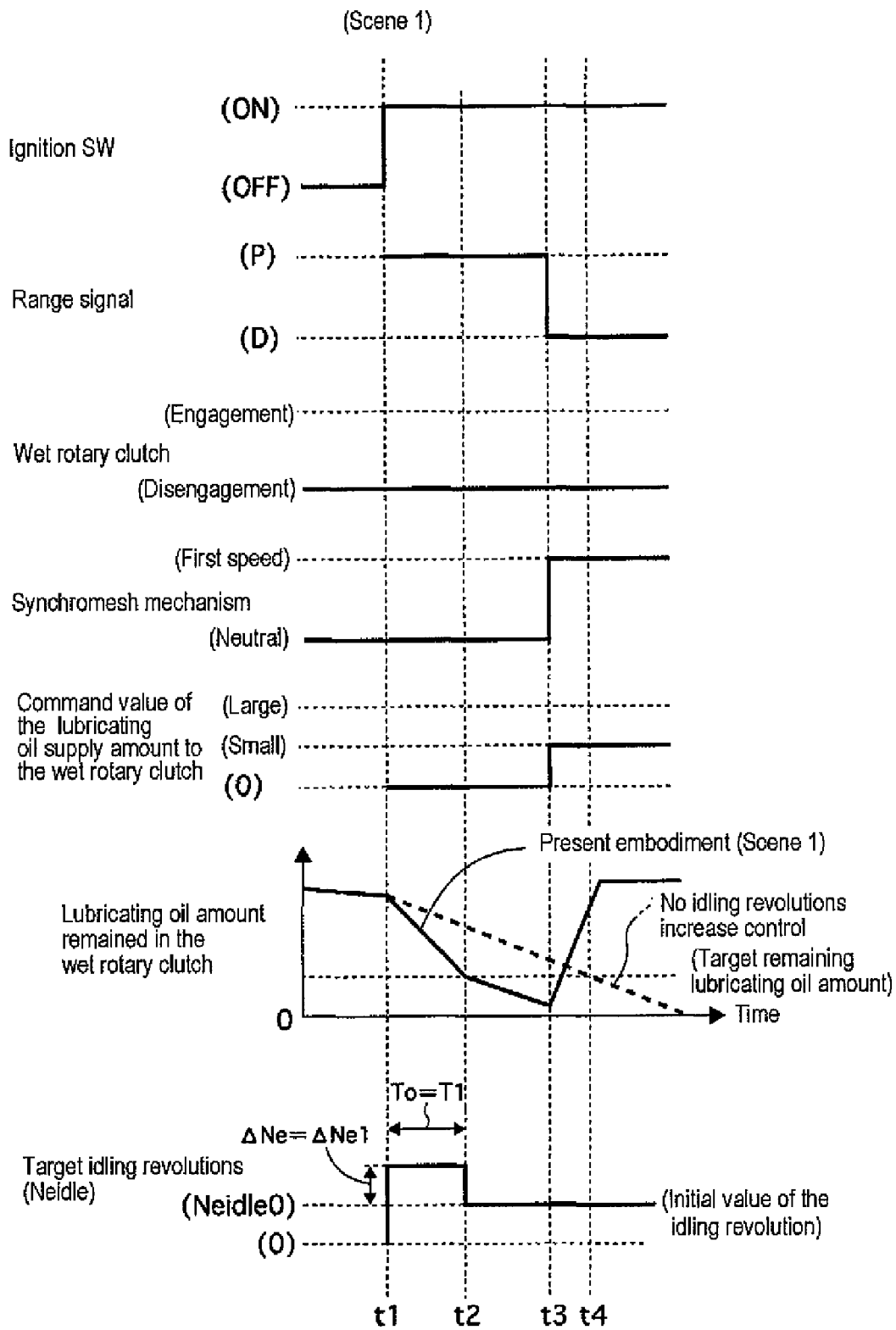
FIG. 6 is an operational chart of Scene 1 showing a drag torque reduction function of the wet rotary clutch executed by operating the control programs of FIGS. 4 and 5.

FIG. 6 is an operational time chart of Scene 1. Scene 1 corresponds to a scene where the lubricating oil temperature is the low temperature causing the drag torque, the driver switches OFF the ignition switch and then ON at time t1 after a short period and executes the selecting operation at time t3 thereafter from the non-driving range (showing the range P but including the range N) to the driving range (showing the range D but including the range L). The corresponding synchromesh mechanism is operated from the neutral mode to the first gear mode to execute the meshing operation for an expected pre-shift.

Further, the accelerator pedal remains released by the driver until or after time t3.

Because the control programs of FIGS. 4 and 5 are started at time t1 when the ignition switch is switched ON, a command value of the lubricating oil supply amount is set to be zero (0)(S116), the idling revolutions increment ΔNe is set as ΔNe1 (e.g., 200 rpm) according to the lubricating oil temperature (S208). The idling revolutions increase time To is set as T1 (e.g., two seconds) according to the lubricating oil temperature (S205).

Although the engine is started at time t1 when the ignition switch is switched ON, the target idling revolutions Neidle is increased by adding the idling revolutions increment (ΔNe=ΔNe1), which corresponds to the lubricating oil temperature, to the initial value Neidle0 (S209).

Thus, the idling operation is executed in the engine to increase of the target idling revolutions (Neidle=Neidle0+ ΔNe1) from the time t1 when the ignition switch is switched ON. The idling revolutions increase control is executed to time t2 when the idling revolutions increase time (To=T1) is elapsed from time t1 when the ignition switch is switched ON. Then, the idling operation is executed with the initial value Neidle0, which becomes the conventional basic value, by setting ΔNe=0 (S211).

Here, upon considering the lubricating oil amount remaining between the clutch discs of the clutches C1 and C2, because the remaining lubricating oil is dropped by gravity until time t1 when the ignition switch is switched ON, the amount of the remaining lubricating oil is gradually reduced as shown before the time t1.

During a period from time t1 when the ignition switch is switched ON to time t2, because the lubricating oil is rapidly scattered by the great centrifugal force according to the idling revolutions increase control, in addition to the control for setting the amount of the lubricating oil supplied as zero (0), the remaining lubricating oil amount is rapidly reduced as indicated with a solid line in Scene 1.

Compared to the value until time t2, the remaining lubricating oil amount is slowly reduced from time t2 by the small centrifugal force according to the conventionally low initial value Neidle0 of the idling revolutions as indicated with the solid line in Scene 1.

However, when ending the idling revolutions increase control (t2), the remaining lubricating oil becomes a target remaining lubricating oil amount (the remaining lubricating oil avoiding the drag torque for hindering the meshing operation of the synchromesh mechanism for the pre-shift).

That is, before time t3 when the synchromesh mechanism, which corresponds in response to the selecting operation from the non-driving range (the range P) to the driving range (the range D), is operated from the neutral mode to the first gear mode to start the meshing operation for the expected pre-shift, the remaining lubricating oil amount may be reduced to the target remaining lubricating oil amount. Thus, the drag torque hindering the meshing operation of the synchromesh mechanism for the pre-shift may be avoided.

However, when the idling revolutions increase control as in the present embodiment is not executed, because only the small centrifugal force according to the conventionally low initial value Neidle0 of the idling revolutions is exerted upon the remaining lubricating oil, the remaining lubricating oil amount is slowly reduced from time t1 as indicated with a dash line and does not become the target remaining lubricating oil amount until time t4.

As such, when the synchromesh is operated from the neutral mode to the first gear mode to be about to start the meshing operation for the expected pre-shift at time t3 in response to the selecting operation from the non-driving range (the range P) to the driving range (the range D), because the remaining lubricating oil amount has not been reduced to the target remaining lubricating oil amount, the drag torque occurs to thereby make the meshing operation of the synchromesh mechanism for the pre-shift become difficult or incomplete.

According to the present embodiment, such a concern may be thoroughly resolved by the idling revolutions increase control as above.

Further, as shown in FIG. 6, when the ignition switch is switched ON at time t1 shortly after the ignition switch is switched OFF or when the ignition switch is switched ON after the ignition switch has been switched OFF for a long period, because the remaining lubricating oil is dropped by gravity before the ignition switch is switched ON, in addition to the control for setting the amount of the lubricating oil supplied as zero (0), the drag torque does not occur.

In such a case, because the idling revolutions increase control as in the present embodiment is not necessary, the deterioration of fuel efficiency by the unnecessary engine idling revolutions increase control may be avoided by not executing the idling revolutions increase control.

Figure 7:
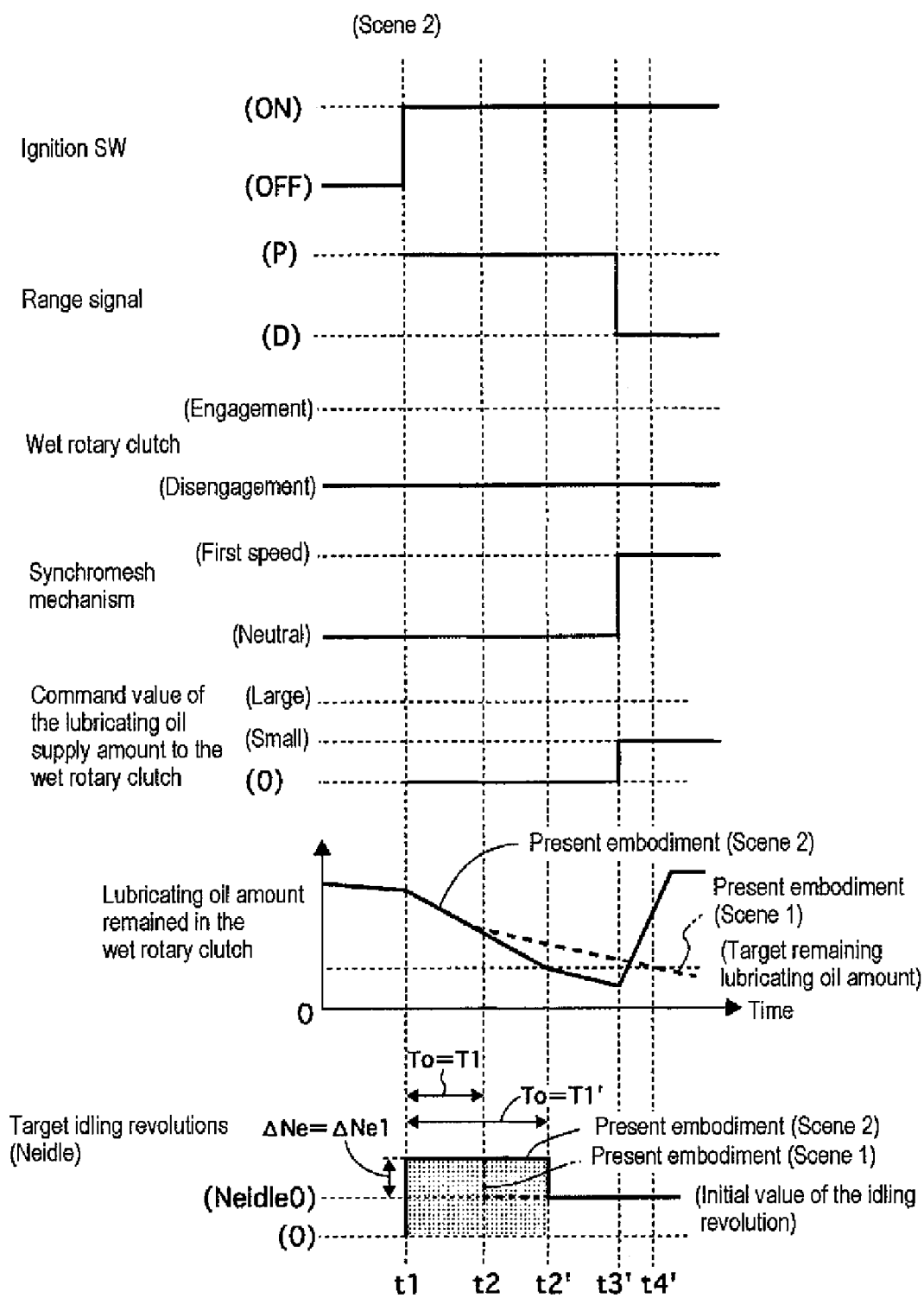
FIG. 7 is an operational chart of Scene 2 showing a drag torque reduction function of the wet rotary clutch executed by operating the control programs of FIGS. 4 and 5.

FIG. 7 shows an operational time chart of Scene 2 when the lubricating oil temperature is a much lower temperature (extremely low temperature) compared to Scene 1 shown in FIG. 6.

Except for the above, other conditions are the same as Scene 1. In FIG. 7, the driver switches ON the ignition switch at time t1 shortly after switching OFF the ignition switch and then executes the selecting operation from the non-driving range (the range P) to the driving range (the range D) at time t3'. Further, the corresponding synchromesh mechanism is operated from the neutral mode to the first gear mode to execute the meshing operation for the expected pre-shift.

Moreover, as in Scene 1, the accelerator pedal remains released by the driver until or after time t3'.

At time t1 when the ignition switch is switched ON, a command value of the lubricating oil supply amount becomes zero (0), the idling revolutions increment ΔNe is set as ΔNe1 (same as in FIG. 6) according to the lubricating oil temperature, and the idling revolutions increase time To is set as T1' (e.g., five seconds) according to the lubricating oil temperature (longer than T1 in FIG. 6 in response to the extremely low temperature).

Although the engine is started at time t1 when the ignition switch is switched ON (as indicated with the solid line in Scene 2), the target idling revolutions Neidle is increased by adding the idling revolutions increment (ΔNe=ΔNe1), which corresponds to the lubricating oil temperature, to the initial value Neidle0.

Thus, the idling operation is executed in the engine to increase the target idling revolutions (Neidle=Neidle0+ ΔNe1) from time t1 when the ignition switch is switched ON. The idling revolutions increase control is executed to time t2' when the idling revolutions increase time (To=T1') is elapsed from time t1 when the ignition switch is switched ON. The idling operation is then executed with the initial value Neidle0 that becomes the conventional basic value.

Because the remaining lubricating oil is dropped by gravity until time t1 when the ignition switch is switched ON, the amount of the remaining lubricating oil between the clutch discs of the clutches C1 and C2 is gradually reduced as shown.

During a period from time t1 when the ignition switch is switched ON to time t2, because the lubricating oil is rapidly scattered by the great centrifugal force according to the idling revolutions increase control, in addition to the control for setting the amount of the lubricating oil supplied as zero (0), the remaining lubricating oil amount is rapidly reduced as indicated with the solid line in Scene 2.

Compared to the value until time t2', the remaining lubricating oil amount is slowly reduced from time t2' by the small centrifugal force according to the conventionally low initial value Neidle0 of the idling revolutions as indicated with the solid line in Scene 2.

However, when ending the idling revolutions increase control (t2'), the remaining lubricating oil becomes a target remaining lubricating oil amount (the remaining lubricating oil avoiding the drag torque for hindering the meshing operation of the synchromesh mechanism for the pre-shift).

That is, before time t3' when the synchromesh mechanism is operated from the neutral mode to the first gear mode to start the meshing operation for the expected pre-shift, the remaining lubricating oil amount may be reduced to the target remaining lubricating oil amount. Thus, the drag torque hindering the meshing operation of the synchromesh mechanism for the pre-shift may be avoided.

However, when the idling revolutions increase time To is set as T1 as in Scene 1 shown in FIG. 6, although the lubricating oil temperature is an extremely low temperature, the target idling revolutions Neidle is reduced to the conventionally low idling revolutions Nedile0 at the earlier time t2 as indicated with the dash line in Scene 1 of FIG. 7. Thus, the remaining lubricating oil amount is slowly reduced from the earlier time t2 as indicated with the dash line in Scene 1 of FIG. 7. It does not become the target remaining lubricating oil amount until time t4', which is later than time t3'.

As such, when synchromesh is operated from the neutral mode to the first gear mode to start the meshing operation for the expected pre-shift at time t3' in response to the selecting operation from the non-driving range (the range P) to the driving range (the range D), because the remaining lubricating oil amount has not been reduced to the target remaining lubricating oil amount, the drag torque occurs to thereby make the meshing operation of the synchromesh mechanism for the pre-shift become difficult or incomplete.

According to the present embodiment, because the idling revolutions increase time To is set as the T1' (longer according to the extremely low temperature), in Scene 2, such a concern may be thoroughly resolved as described above.

Figure 8:
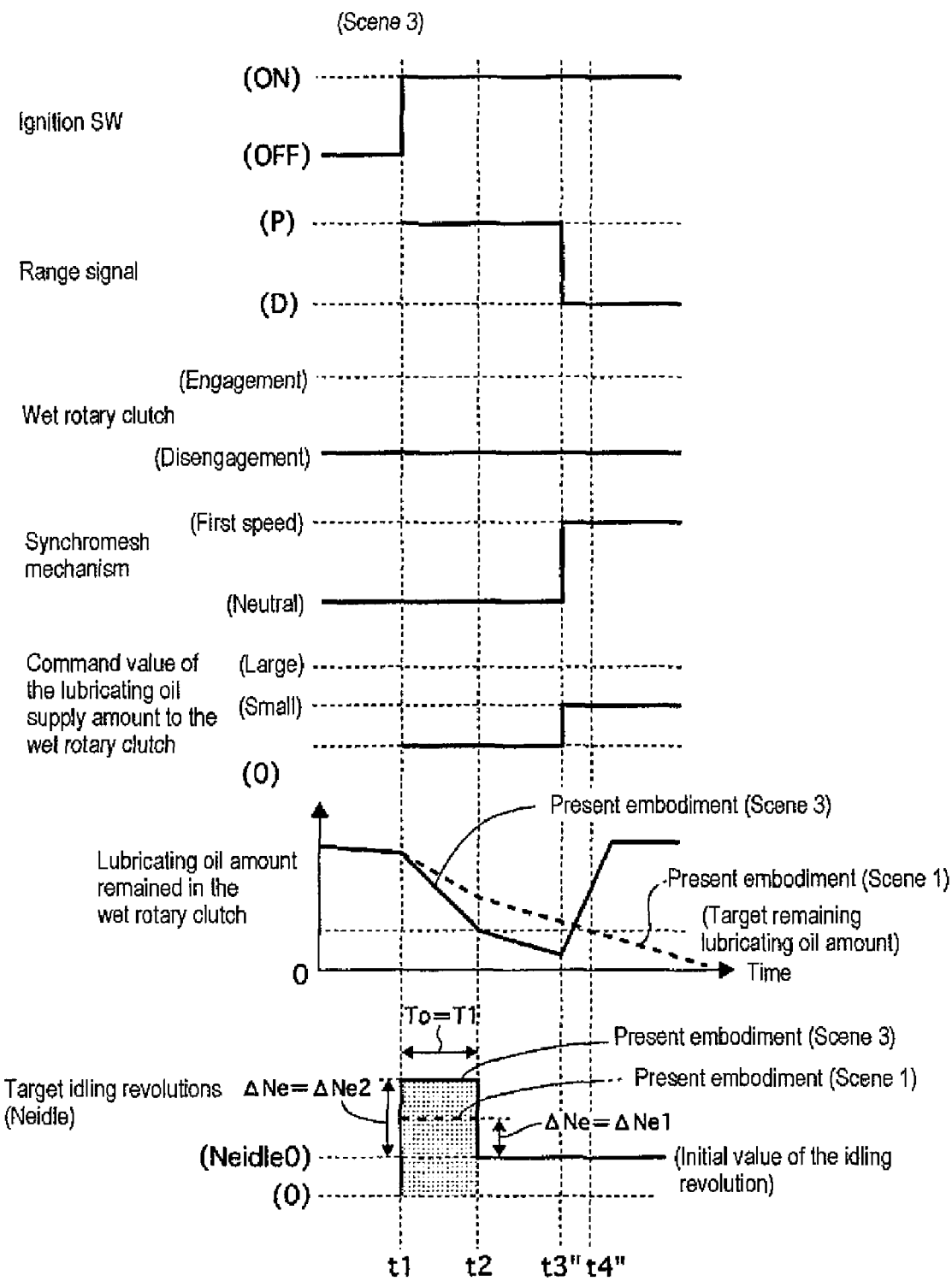
FIG. 8 is an operational chart of Scene 3 showing a drag torque reduction function of the wet rotary clutch executed by operating the control programs of FIGS. 4 and 5.

FIG. 8 shows an operational time chart of Scene 3 when the lubricating oil temperature is a much lower temperature (extremely low temperature) compared to Scene 1 shown in FIG. 6.

Except for the above, other conditions are the same as in Scene 1 shown in FIG. 6. In FIG. 8, the driver switches ON the ignition switch at time t1 shortly after switching OFF the ignition switch and then executes the selecting operation from the non-driving range (the range P) to the driving range (the range D) at time t3''. Further, the corresponding synchromesh mechanism is operated from the neutral mode to the first gear mode to execute the meshing operation for the expected pre-shift.

Further, as in Scene 1, the accelerator pedal remains released by the driver until or after time t3''.

At time t1 when the ignition switch is switched ON, a command value of the lubricating oil supply amount is set to be zero (0), the idling revolutions increment $\Delta Ne$ is set as $\Delta Ne2$ (300 rpm) according to the lubricating oil temperature (greater than $\Delta Ne1$ in FIG. 6 in response to the extremely low temperature) as indicated with the solid line in Scene 3, and the idling revolutions increase time To is set as T1 (same as in FIG. 6) according to the lubricating oil temperature.

Although the engine is started at time t1 when the ignition switch is switched ON (as indicated with the solid line in Scene 3), the target idling revolutions Neidle is increased by adding the idling revolutions increment ($\Delta Ne=\Delta Ne2$), which corresponds to the lubricating oil temperature, to the initial value Neidle0.

Thus, the idling operation is executed in the engine to increase the target idling revolutions (Neidle=Neidle0+$\Delta Ne2$) from time t1 when the ignition switch is switched ON. The idling revolutions increase control is executed to time t2 when the idling revolutions increase time (To=T1) is elapsed from time t1 when the ignition switch is switched ON. Then, the idling operation is executed with the initial value Neidle0, which becomes the conventional basic value.

Because the remaining lubricating oil is dropped by gravity until time t1 when the ignition switch is switched ON, the amount of the remaining lubricating oil between the clutch discs of the clutches C1 and C2 is gradually reduced as shown before the time t1.

During a period from time t1 when the ignition switch is switched ON to time t2, because the lubricating oil is rapidly scattered by the great centrifugal force according to the idling revolutions increase control, in addition to the control for setting the amount of the lubricating oil supplied as zero (0), the remaining lubricating oil amount is rapidly reduced as indicated with the solid line in Scene 3.

Compared to the value until time t2, the remaining lubricating oil amount is slowly reduced from time t2 by the small centrifugal force according to the conventionally low initial value Neidle0 of the idling revolutions as indicated with the solid line in Scene 3.

However, when ending the idling revolutions increase control (t2), the remaining lubricating oil becomes the target remaining lubricating oil amount (the remaining lubricating oil avoiding the drag torque for hindering the meshing operation of the synchromesh mechanism for the pre-shift).

That is, before time t3'' when the synchromesh mechanism, which corresponds in response to the selecting operation from the non-driving range (range P) to the driving range (range D), is operated from the neutral mode to the first gear mode to start the meshing operation for the expected pre-shift, the remaining lubricating oil amount cane be reduced to the target remaining lubricating oil amount. Thus, the drag torque hindering the meshing operation of the synchromesh mechanism for the pre-shift may be avoided.

However, when the idling revolutions increase time To is provided as T1 as shown in FIG. 6, although the lubricating oil temperature is an extremely low temperature, the target idling revolutions Neidle is slightly increased from the conventionally low idling revolutions Nedile0 as indicated with the dash line in Scene 1 of FIG. 8. Thus, the centrifugal force exerted upon the remaining lubricating oil is insufficient to scatter the remaining lubricating oil.

In this regard, because the speed of reducing the remaining lubricating oil amount from time t1 is slow as indicated with the dash line in Scene 1 of FIG. 8 and the speed of reducing the remaining lubricating oil amount becomes slower from time t2 until the idling revolutions increase control is ended, the remaining lubricating oil amount does not become the target remaining lubricating oil amount until time t4''.

As such, when the synchromesh is operated from the neutral mode to the first gear mode to start the meshing operation for the expected pre-shift at time t3'' in response to the selecting operation from the non-driving range (range P) to the driving range (range D), because the remaining lubricating oil amount has not been reduced to the target remaining lubricating oil amount, the drag torque occurs. This makes the meshing operation of the synchromesh mechanism for the pre-shift difficult or incomplete.

According to the present embodiment, because the idling revolutions increment $\Delta Ne$ is provided as $\Delta Ne2$ (greater according to the extremely low temperature), in Scene 3, such a concern may be thoroughly resolved as described above.

In addition, in Scene 2 of FIG. 7 and Scene 3 of FIG. 8, when the lubricating oil temperature is the same extremely low temperature, the idling revolutions increment $\Delta Ne$ and the idling revolutions increase time To are determined such that the areas of the shaded regions in FIGS. 7 and 8, which is a multiplication of the idling revolutions after the increase (Neidle0+$\Delta Ne$) and the idling revolutions increase time To, are identical. By doing so, the drag torque reduction effect for the extremely low temperature may be achieved.

Further, if such an area corresponds to the lubricating oil temperature, any combination of the idling revolutions increment ΔNe and the idling revolutions increase time To may be optionally determined according to the design of a hardware.

Figure 9:
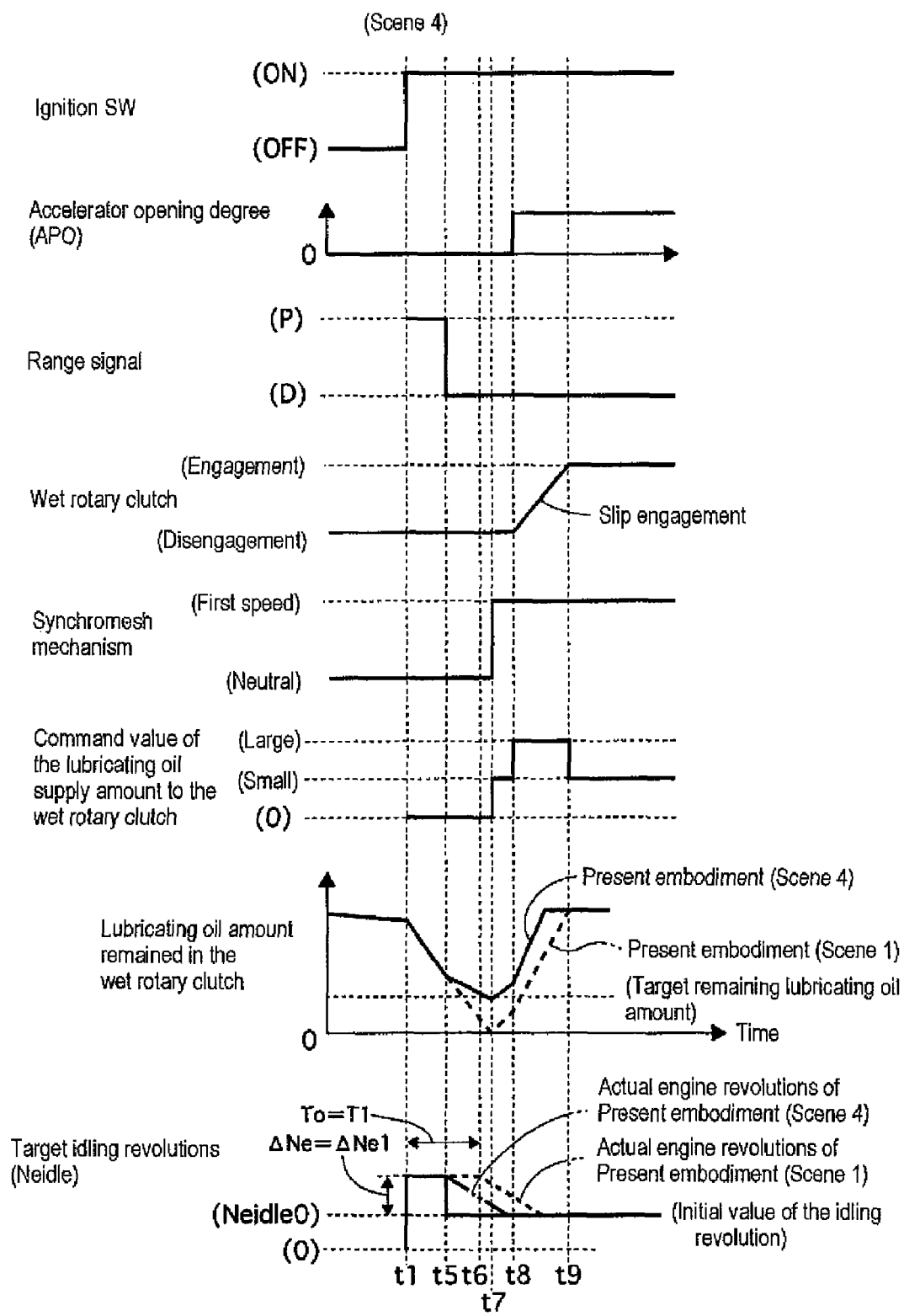
FIG. 9 is an operational chart of Scene 4 showing a drag torque reduction function of the wet rotary clutch executed by operating the control programs of FIGS. 4 and 5.

FIG. 9 shows an operational time chart of Scene 4 when the lubricating oil temperature is the same low temperature as Scene 1. Further, similar to Scene 1, the driver switches ON the ignition switch at time t1 shortly after switching OFF the ignition switch. The driver then executes the selecting operation from the non-driving range (range P) to the driving range (range D) during the idling revolutions increase control time (To=T1) when the idling revolutions increase control, which is started at time t1 when the ignition switch is switched ON, is still being executed [before time t6 when the idling revolutions increase control time (To=T1) is elapsed from time t1].

At time t1 when the ignition switch is switched ON, a command value of the lubricating oil supply amount is set to be zero (0), the idling revolutions increment ΔNe is provided as ΔNe1 according to the lubricating oil temperature, and the idling revolutions increase time To is provided as T1 according to the lubricating oil temperature.

The target idling revolutions Neidle of the engine, which is started at time t1 when the ignition switch is switched ON, increases by adding the idling revolutions increment (ΔNe=ΔNe1), which corresponds to the lubricating oil temperature, to the initial value Neidle0.

Thus, the idling operation is executed in the engine to increase the target idling revolutions (Neidle=Neidle0+ΔNe1) from time t1 when the ignition switch is switched ON. The idling revolutions increase control is normally executed until time t6 when the idling revolutions increase time (To=T1) is elapsed from time t1 when the ignition switch is switched ON.

However, in Scene 4, the selecting operation from the non-driving range (range P) to the driving range (range D) is executed at time t5 during the idling revolutions increase control time (To=T1). Thus, the target idling revolutions Neidle becomes the initial value Neidle0 at time t5 of executing the selecting operation as indicated with the solid line (S203, S211 and S209), and the idling revolutions increase control is ended.

As such, after time t5 when the selecting operation is started, the actual engine revolutions is reduced with a particular engine characteristic response delay as indicated with a double dot line in Scene 4.

Here, upon considering the remaining lubricating oil amount between the clutch discs of the clutches C1 and C2, because the remaining lubricating oil amount is dropped by gravity until time t1 when the ignition switch is switched ON, the remaining lubricating oil amount is gradually reduced as shown.

During a period from time t1 when the ignition switch is switched ON to time t5, because the lubricating oil is rapidly scattered by the great centrifugal force according to the idling revolutions increase control, in addition to the control for setting the amount of the lubricating oil supplied as zero (0), the remaining lubricating oil amount is rapidly reduced as indicated with the solid line in Scene 4.

Compared to the remaining lubricating oil amount until time t5, as indicated with the solid line in Scene 4, the remaining lubricating oil amount is slowly reduced from time t5 by the small centrifugal force in response to the reduction of the actual engine revolutions indicated with the double dot line.

However, due to the rapid reduction of the remaining lubricating oil amount until time t5, the remaining lubricating oil amount reaches the target remaining lubricating oil amount (the remaining lubricating oil amount avoiding the drag torque for hindering the meshing operation of the synchromesh mechanism for the pre-shift) at a relatively earlier time t7.

Because the remaining lubricating oil amount is reduced to the target remaining lubricating oil amount at time t7, it becomes possible to execute the meshing operation of the synchromesh mechanism for the pre-shift corresponding to the selecting operation at the time t5. Thus, the synchromesh mechanism is capable of executing the meshing operation by the operation from the neutral mode to the first gear mode.

At time t7 when the meshing operation (pre-shift) of the synchromesh mechanism by the operation from the neutral mode to the first gear mode has completed, the command value of the remaining lubricating oil amount is set to be a small amount (S106, S107, S110, S113 and S114).

After time t5 of the selecting operation from the non-driving range (range P) to the driving range (range D), the driver executes the initial movement operation at time t8 by increasing the accelerator opening degree APO, in order to allow this initial movement operation, the wet rotary clutch C1 is slip-engagement controlled by a predetermined time change gradient in preparation for the gradual increase in engagement force. The wet rotary clutch C1 becomes completely engaged at time t9.

Because the heat generated in the clutch C1 is great during the slip-engagement of the wet rotary clutch (from t8 to t9), the command values of the lubricating oil supply amount is set to be a large amount (S106, S107, S108 and S109).

After time t9 when the wet rotary clutch becomes completely engaged, the command values of the lubricating oil supply amount is set to be a small amount (S106, S107, S110, S113 and S114).

However, when the selecting operation from the non-driving range (range P) to the driving range (range D) is executed at time t5 during the idling revolutions increase control (To=T1), the target idling revolutions Neidle is the initial value Nedile0 as indicated with the solid line at time t5 to end the idling revolutions increase control. Thus, although the actual engine revolutions is reduced with the particular engine characteristic response delay as indicated with the double dot line in Scene 4 after time t5, because the actual engine revolutions may be returned to the initial value Nedile0 before starting the slip-engagement of the wet rotary clutch C1 for initial movement in response to the initial movement operation at the time t5, the shift shock or sudden start of the wet rotary clutch C1 for initial movement may be prevented.

On the other hand, even when the selecting operation is executed at time t5 during the idling revolutions increase control (To=T1) from the non-driving range (range P) to the driving range (range D), if the idling revolutions increase control in FIG. 6 continues, the actual engine revolutions reduction is greatly delayed as indicated with the dash line of Scene 1 of FIG. 9. Thus, because the actual engine revolutions is still much higher than the initial value Nedile0 at time t8 of starting the slip-engagement of the wet rotary clutch C1 for initial movement in response to the initial movement operation, the shift shock or sudden start of the wet rotary clutch C1 for starting occurs.

According to the control in Scene 4 indicated with the solid line of FIG. 9, the shift shock or sudden start of the clutch C1 may be avoided.

Figure 10:
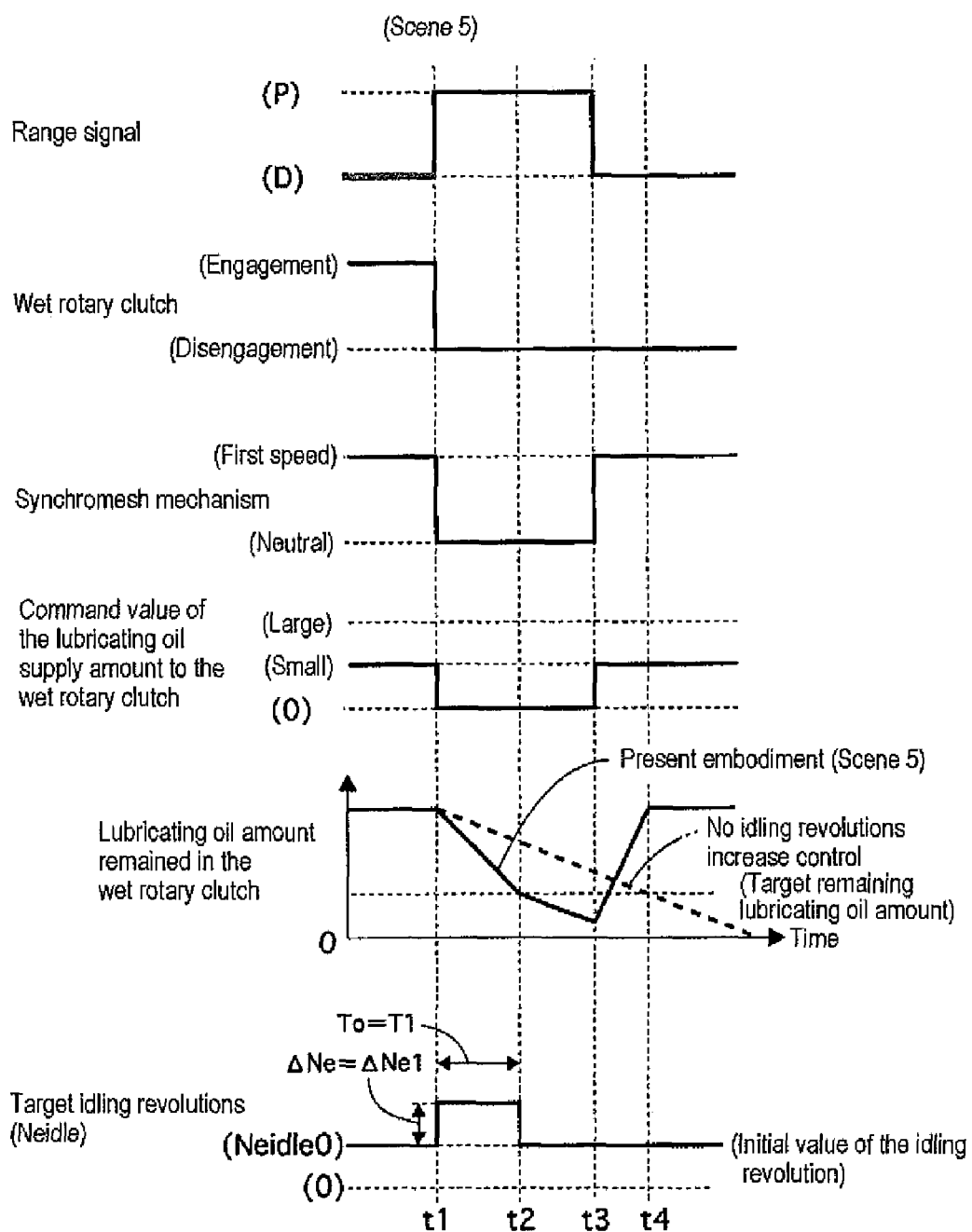
FIG. 10 is an operational chart of Scene 5 showing a drag torque reduction function of the wet rotary clutch executed by operating the control programs of FIGS. 4 and 5.

FIG. 10 shows an operational time chart of Scene 5 when the lubricating oil temperature is the same temperature (extremely low temperature) as Scene 1, illustrating functions when the selecting operation from the driving range (the range D) to the non-driving range (the range P) is executed at time t1 while vehicle is remains stopped by the operation of the brake and the idling operation is executed in the engine. This is so that the corresponding synchromesh mechanism is operated from the first gear mode to the neutral mode to execute the separating operation for the expected pre-shift. When the selecting operation from the non-driving range (range P) to the driving range (range D) is executed at time t3, the corresponding synchromesh mechanism is operated from the neutral mode to the first gear mode to execute the meshing operation for the expected pre-shift.

At time t1 of executing the selecting operation from the driving range (range D) to the non-driving range (range P), the wet rotary clutch becomes disengaged by the separating operation of the synchromesh mechanism and the command value of the lubricating oil supply amount to the wet rotary clutch is set to be zero (0) in response thereto (S128), the idling revolutions increment $\Delta Ne$ is provided as $\Delta Ne1$ according to the lubricating oil temperature (S208), and the idling revolutions increase time To is provided as T1 according to the lubricating oil temperature (S205).

Thus, at time t1 of executing the selecting operation from the driving range (range D) to the non-driving range (range P), the target idling revolutions Neidle of the engine increases by adding the idling revolutions increment ($\Delta Ne=\Delta Ne1$), which corresponds to the lubricating oil temperature, to the initial value Neidle0 (S209).

By doing so, the idling operation is executed in the engine to increase the target idling revolutions (Neidle=Neidle0+$\Delta Ne2$) from time t1 when the selecting operation from the driving range (range D) to the non-driving range (range P) is executed. The idling revolutions increase control is executed to time t2 when the idling revolutions increase time (To=T1) is elapsed from time t1. Then, the idling operation is executed with the initial value Neidle0, which becomes the conventional basic value, by $\Delta Ne=0$ (S211).

Because the command value of the lubricating oil supply amount is set to be a small amount until time t1 for the reasons stated above, the remaining lubricating oil amount remains in the clutch at time t1.

Thus, because the lubricating oil is rapidly scattered by the great centrifugal force according to the idling revolutions increase control during the period from time t1 to time t2, in addition to the control for setting the amount of the lubricating oil supplied to be zero (0), the remaining lubricating oil amount is rapidly reduced as indicated with the solid line in Scene 5.

Compared to the remaining lubricating oil amount until time t2, the remaining lubricating oil amount is slowly reduced from time t2 by the small centrifugal force according to the conventionally low initial value Neidle0 of the idling revolutions as indicated with the solid line in Scene 5.

However, when ending the idling revolutions increase control (t2), the remaining lubricating oil becomes a target remaining lubricating oil amount (the remaining lubricating oil avoiding the drag torque for hindering the meshing operation of the synchromesh mechanism for the pre-shift).

As such, before the synchromesh mechanism is operated from the neutral mode to the first gear mode to start the meshing operation for the expected pre-shift in response to the selecting operation from the non-driving range (range P) to the driving range (range D) executed at time t3, the remaining lubricating oil amount may be reduced to the target remaining lubricating oil amount. Thus, the drag torque hindering the meshing operation of the synchromesh mechanism for the pre-shift may be avoided.

However, when the idling revolutions increase control as in the present embodiment is not executed, because only the small centrifugal force according to the conventionally low initial value Neidle0 of the idling revolutions is exerted to the remaining lubricating oil, the remaining lubricating oil amount is slowly reduced from time t1 as indicated with the dash line and does not meet the target remaining lubricating oil amount until time t4.

As such, when the synchromesh is operated from the neutral mode to the first gear mode to start the meshing operation for the expected pre-shift at time t3 in response to the selecting operation from the non-driving range (range P) to the driving range (range D), because the remaining lubricating oil amount has not been reduced to the target remaining lubricating oil amount, the drag torque occurs to thereby make the meshing operation of the synchromesh mechanism for the pre-shift become difficult or incomplete.

According to the present embodiment, such concern may be thoroughly resolved by the idling revolutions increase control as above.

Further, FIG. 10 shows the operation when the time between time t1 of executing the selecting operation from the driving range (range D) to the non-driving range (range P) and time t3 of executing the non-driving range (range P) to the driving range (range D). However, if the time between time t1 and time t3 is short, the remaining lubricating oil may be mostly scattered by the small centrifugal force by the conventional idling revolutions Neidle0 without the increase control before time t3 of executing the non-driving range (range P) to the driving range (range D). Thus, in addition to the control for setting the amount of the lubricating oil supplied as zero (0), the clutch torque does not occur.

In such a case, because the idling revolutions increase control as in the present embodiment is not necessary, the deterioration in fuel efficiency by the unnecessary engine idling revolutions increase control may be avoided by not executing the idling revolutions increase control.

Figure 11:
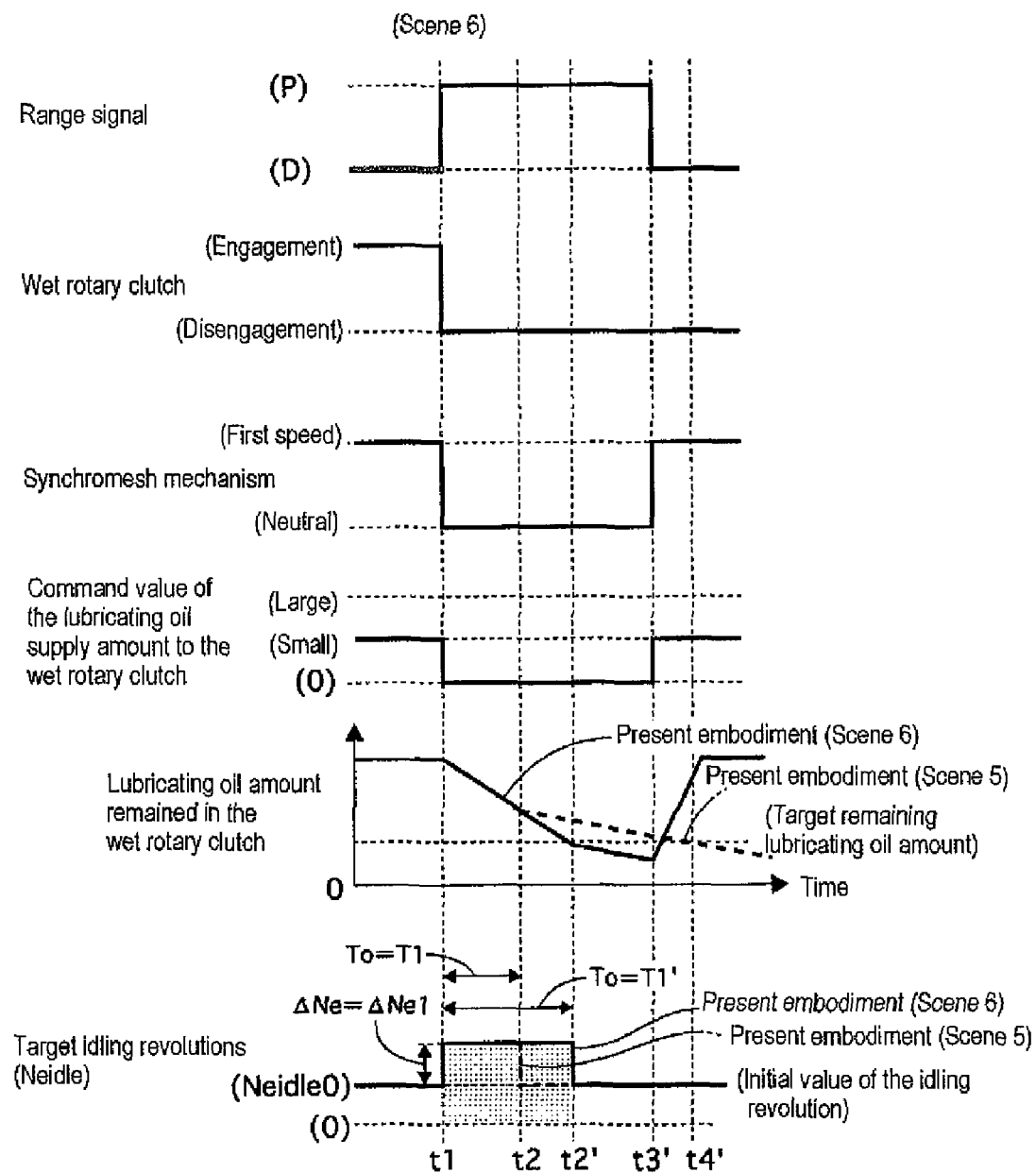
FIG. 11 is an operational chart of Scene 6 showing a drag torque reduction function of the wet rotary clutch executed by operating the control programs of FIGS. 4 and 5.

FIG. 11 shows an operational time chart of Scene 6 when the lubricating oil temperature is a much lower temperature (extremely low temperature) compared to Scene 5 shown in FIG. 10.

Except for the above, other conditions are the same as Scene 5 shown in FIG. 10. In FIG. 11, the selecting operation from the driving range (range D) to the non-driving range (range P) is executed at time t1 while the vehicle remains stopped by the operation of the brake and the idling operation is executed in the engine. This is so that the corresponding synchromesh mechanism is operated from the first gear mode to the neutral mode to execute the separating operation for the expected pre-shift. Further, the selecting operation from the non-driving range (range P) to the driving range (range D) is executed at time t3'. This is so that the corresponding synchromesh mechanism is operated from the neutral mode to the first gear mode to execute the meshing operation for the expected pre-shift.

At time t1 of executing the selecting operation from the driving range (range D) to the non-driving range (range P), the wet rotary clutch is disengaged with the separating operation of the synchromesh mechanism and the command value of the lubricating oil supply amount to the wet rotary clutch is set to be zero (0) in response thereto. The idling revolutions increment $\Delta Ne$ is set as $\Delta Ne1$ according to the lubricating oil temperature ($\Delta Ne1$ is the same value as in FIG. 10) and the idling revolutions increase time To is set as T1' according to the lubricating oil temperature (longer than T1 in FIG. 10 in response to the extremely low temperature).

By doing so, the idling operation is executed in the engine to increase the target idling revolutions (Neidle=Neidle0+ ΔNe1) from time t1 when the selecting operation from the driving range (range D) to the non-driving range (range P) is executed. The idling revolutions increase control is executed to time t2' when the idling revolutions increase time (To=T1') is elapsed from time t1. The idling operation is then executed with the initial value Neidle0, which becomes the conventional basic value.

Thus, because the lubricating oil is rapidly scattered by the great centrifugal force according to the idling revolutions increase control during the period from time t1 to time t2', in addition to the control for setting the amount of the lubricating oil supplied as zero (0), the remaining lubricating oil amount is rapidly reduced as indicated with the solid line in Scene 6.

Compared to the remaining lubricating oil amount until time t2', the remaining lubricating oil amount is slowly reduced from time t2' by the small centrifugal force according to the conventionally low initial value Neidle0 of the idling revolutions as indicated with the solid line in Scene 6.

However, at the time of ending the idling revolutions increase control (t2'), the remaining lubricating oil meets the target remaining lubricating oil amount.

Thus, before the synchromesh mechanism is operated from the neutral mode to the first gear mode to start the meshing operation for the expected pre-shift in response to the selecting operation from the non-driving range (range P) to the driving range (range D) executed at time t3', the remaining lubricating oil amount may be reduced to the target remaining lubricating oil amount. As such, the drag torque hindering the meshing operation of the synchromesh mechanism for the pre-shift may be avoided.

However, when the idling revolutions increase time is provided as T1 as in Scene of FIG. 11 although the lubricating oil temperature is the extremely low temperature, the target idling revolutions Neidle is reduced to the conventionally low idling revolutions Nedile0 at the earlier time t2 as indicated with the dash line in Scene 5 of FIG. 11. Thus, the remaining lubricating oil amount is slowly reduced from the earlier time t2 as indicated with the dash line in Scene 5 of FIG. 11 and does not meet the target remaining lubricating oil amount until time t4'.

As such, when the synchromesh is operated from the neutral mode to the first gear mode to start the meshing operation for the expected pre-shift at time t3' in response to the selecting operation from the non-driving range (range P) to the driving range (range D), because the remaining lubricating oil amount has not been reduced to the target remaining lubricating oil amount, the drag torque occurs to thereby make the meshing operation of the synchromesh mechanism for the pre-shift become difficult or incomplete.

According to the present embodiment, because the idling revolutions increase time To is provided as T1', which is longer according to the extremely low temperature, in Scene 6, such a concern may be thoroughly resolved as described above.

Figure 12:
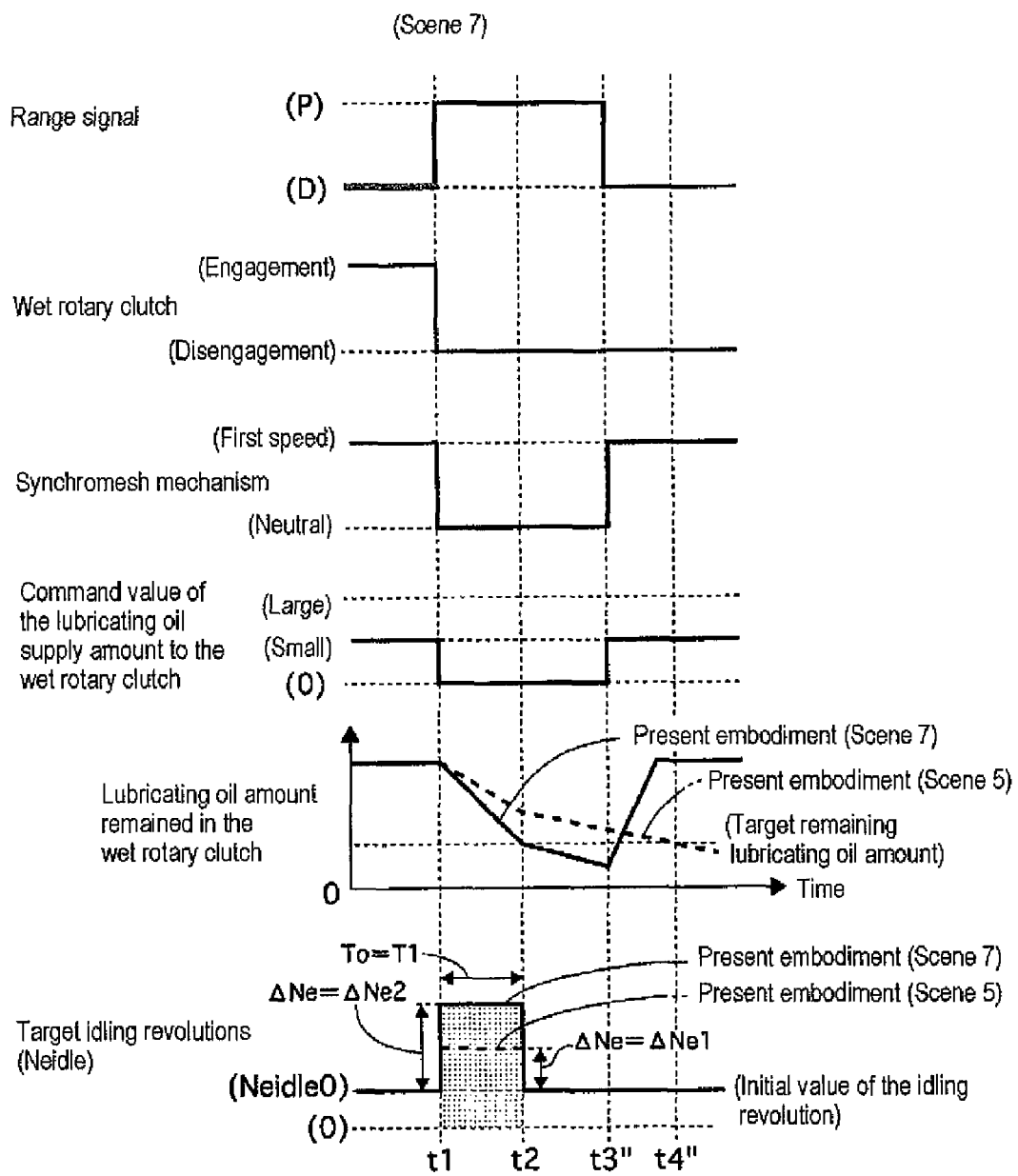
FIG. 12 is an operational chart of Scene 7 showing a drag torque reduction function of the wet rotary clutch executed by operating the control programs of FIGS. 4 and 5.

FIG. 12 shows an operational time chart of Scene 7 when the lubricating oil temperature is a much lower temperature (extremely low temperature) compared to Scene 5 shown in FIG. 10.

Except for the above, other conditions are the same as Scene 5 shown in FIG. 10. In FIG. 12, the selecting operation from the driving range (range D) to the non-driving range (range P) is executed at time t1 while vehicle remains stopped by the operation of the brake and the idling operation is executed in the engine. This is so that the corresponding synchromesh mechanism is operated from the first gear mode to the neutral mode to execute the separating operation for the expected pre-shift. Further, the selecting operation from the non-driving range (range P) to the driving range (range D) is executed at time t3" such that the corresponding synchromesh mechanism is operated from the neutral mode to the first gear mode to execute the meshing operation for the expected pre-shift.

At time t1 of executing the selecting operation from the driving range (range D) to the non-driving range (range P), the wet rotary clutch is disengaged with the separating operation of the synchromesh mechanism. Further, the command value of the lubricating oil supply amount to the wet rotary clutch is set to be zero (0) in response thereto. The idling revolutions increment ΔNe is provided as ΔNe2 according to the lubricating oil temperature (greater than ΔNe1 in FIG. 10 in response to the extremely low temperature) as indicated with the solid line in Scene 7. Also, the idling revolutions increase time To is provided as T1 according to the lubricating oil temperature (T1 is the same value in FIG. 10).

By doing so, the idling operation is executed in the engine to increase the target idling revolutions (Neidle=Neidle0+ ΔNe2) from time t1 when the selecting operation from the driving range (range D) to the non-driving range (range P) is executed. The idling revolutions increase control is executed to time t2 when the idling revolutions increase time (To=T1) is elapsed from time t1. The idling operation is then executed with the initial value Neidle0, which becomes the conventional basic value.

Thus, because the lubricating oil is rapidly scattered by the great centrifugal force according to the idling revolutions increase control during the period from time t1 to time t2, in addition to the control for setting the amount of the lubricating oil supplied as zero (0), the remaining lubricating oil amount is rapidly reduced as indicated with the solid line in Scene 7.

Compared to the remaining lubricating oil amount until time t2, the remaining lubricating oil amount is slowly reduced from time t2 by the small centrifugal force according to the conventionally low initial value Neidle0 of the idling revolutions as indicated with the solid line in Scene 7.

However, when ending the idling revolutions increase control (t2), the remaining lubricating oil meets a target remaining lubricating oil amount.

Thus, before the synchromesh mechanism is operated from the neutral mode to the first gear mode to start the meshing operation for the expected pre-shift in response to the selecting operation from the non-driving range (range P) to the driving range (range D) executed at time t3", the remaining lubricating oil amount may be reduced to the target remaining lubricating oil amount. As such, the drag torque hindering the meshing operation of the synchromesh mechanism for the pre-shift may be avoided.

However, when the idling revolutions increment ΔNe is provided as ΔNe1 as in FIG. 10, although the lubricating oil temperature is the extremely low temperature, the target idling revolutions Neidle is slightly increased from the conventionally low idling revolutions Nedile0 as indicated with the dash line in Scene 5 of FIG. 12. Thus, the centrifugal force exerted to the remaining lubricating oil is insufficient to scatter the remaining lubricating oil from the clutch discs.

In this regard, because the speed of reducing the remaining lubricating oil amount from time t1 is slow as indicated with the dash line in Scene 5 of FIG. 12 and the speed of reducing the remaining lubricating oil amount becomes slower from time t2 until the idling revolutions increase control is ended, the remaining lubricating oil amount does not meet the target remaining lubricating oil amount until time t4".

As such, when the synchromesh is operated from the neutral mode to the first gear mode to start the meshing operation for the expected pre-shift at time t3" in response to the selecting operation from the non-driving range (range P) to the driving range (range D), because the remaining lubricating oil amount has not been reduced to the target remaining lubricating oil amount, the drag torque occurs to thereby make the meshing operation of the synchromesh mechanism for the pre-shift become difficult or incomplete.

According to the present embodiment, because the idling revolutions increment ΔNe is provided as ΔNe2 (greater according to the extremely low temperature), in Scene 7, such a concern may be thoroughly resolved as described above.

In addition, in Scene 6 of FIG. 11 and Scene 7 of FIG. 12, when the lubricating oil temperature is the same extremely low temperature, the idling revolutions increment ΔNe and the idling revolutions increase time To are determined such that the areas in the shaded regions shown in FIG. 11 and FIG. 12, which is a multiplication of the idling revolutions after the increase (Neidle0+ΔNe) and the idling revolutions increase time To, are identical. By doing so, the drag torque reduction effect for the extremely low temperature may be achieved.

Further, if such an area corresponds to the lubricating oil temperature, any combination of the idling revolutions increment ΔNe and the idling revolutions increase time To may be optionally determined according to a design of a hardware.

Figure 13:
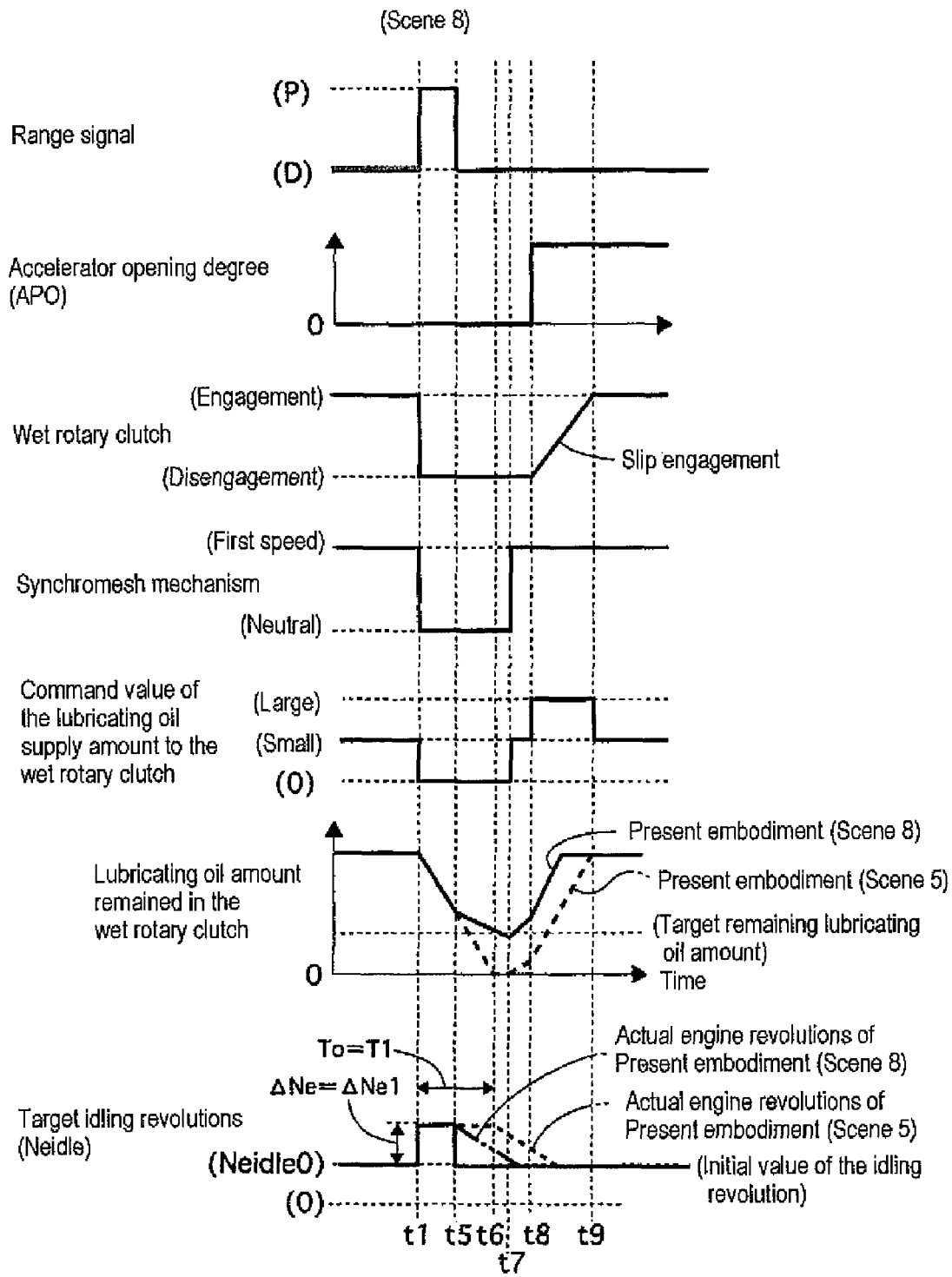
FIG. 13 is an operational chart of Scene 8 showing a drag torque reduction function of the wet rotary clutch executed by operating the control programs of FIGS. 4 and 5.

FIG. 13 shows an operational time chart of Scene 8 when the lubricating oil temperature is the same low temperature as Scene 5 shown in FIG. 10. Further, like Scene 5 of FIG. 10, FIG. 13 illustrates the functions when the selecting operation from the driving range (range D) to the non-driving range (range P) is executed at time t1 while vehicle remains stopped by the operation of the brake and the idling operation is executed in the engine. This is so that the corresponding synchromesh mechanism is operated from the first gear mode to the neutral mode to execute the separating operation for the expected pre-shift. At the time of selecting operation from the non-driving range (range P) to the driving range (range D) is executed during the idling revolutions increase control time (To=T1) when the idling revolutions increase control, which is started at time t1 of executing the selecting operation, is still being executed [before time t6 when the idling revolutions increase control time (To=T1) is elapsed from time t1].

At time t1 of executing the selecting operation, the command value of the lubricating oil supply amount is set to be zero (0), the idling revolutions increment ΔNe is provided as ΔNe1 according to the lubricating oil temperature. Further, the idling revolutions increase time To is established as T1 according to the lubricating oil temperature.

The target idling revolutions Neidle of the engine, which is started at time t1 of executing the selecting operation, is increased by adding the idling revolutions increment (ΔNe=ΔNe1), which corresponds to the lubricating oil temperature, to the initial value Neidle0.

Thus, the idling operation is executed in the engine to increase the target idling revolutions (Neidle=Neidle0+ΔNe1) from time t1 of executing the selecting operation. The idling revolutions increase control is normally executed until time t6 the idling revolutions increase control time (To=T1) is elapsed from time t1.

However, in Scene 8, the selecting operation from the non-driving range (range P) to the driving range (range D) is executed at time t5 during the idling revolutions increase control time (To=T1). Thus, the target idling revolutions Neidle becomes the initial value Neidle0 at time t5 of executing the selecting operation as indicated with the solid line (S203, S211 and S209), and the idling revolutions increase control is ended.

As such, after time t5 when the selecting operation is started, the actual engine revolutions is reduced with a particular engine characteristic response delay as indicated with a double dot line in Scene 8.

Because the lubricating oil is rapidly scattered by the great centrifugal force by the idling revolutions increase control during the period from time t1 of executing the selecting operation to time t5, in addition to the control of setting the lubricating oil supply amount as zero (0), the remaining lubricating oil is rapidly reduced as indicated with the solid line in Scene 8.

Compared to the value until time t5, as indicated with the solid line in Scene 8, the remaining lubricating oil amount is slowly reduced from time t5 by the small centrifugal force in response to the actual engine revolutions reduction indicated with the double dot line.

However, due to the rapid reduction of the remaining lubricating oil amount until time t5, the remaining lubricating oil amount meets the target remaining lubricating oil amount (the remaining lubricating oil amount avoiding the clutch grad torque for hindering the meshing operation of the synchromesh mechanism for the pre-shift) at a relatively earlier time t7.

As such, if the remaining lubricating oil amount is reduced to the target remaining lubricating oil amount at time t7, it becomes possible to execute the meshing operation of the synchromesh mechanism for the pre-shift corresponding to the selecting operation at time t5. Thus, at time t7, the synchromesh mechanism is capable of executing the meshing operation by the operation from the neutral mode to the first gear mode.

At time t7 when the meshing operation (pre-shift) of the synchromesh mechanism by the operation from the neutral mode to the first gear mode is ended, the command value of the clutch remaining lubricating supply amount is set as a small amount (S106, S107, S110, S113 and S114).

After time t5 of the selecting operation from the non-driving range (range P) to the driving range (range D), if the driver executes the initial movement operation at time t8 by the increase of the accelerator opening degree APO, in order to allow this initial movement operation, the wet rotary clutch C1 is slip-engagement controlled by a predetermined time change gradient in preparation for the shift shock and the engagement force is gradually increased. Then, the wet rotary clutch C1 becomes completely engaged at time t9.

Because the heat generated in the clutch C1 is great during the slip-engagement of the wet rotary clutch C1 (t8 to t9), the command values of the lubricating oil supply amount is set to be a large amount (S106, S107, S108 and S109).

After time t9 when the wet rotary clutch becomes the complete engagement state, a small amount of the command values of the lubricating oil supply amount is set (S106, S107, S110, S113 and S114).

However, when the selecting operation from the non-driving range (range P) to the driving range (range D) is executed at time t5 during the idling revolutions increase control (To=T1), the target idling revolutions Neidle is the initial value Nedile0 as indicated with the solid line at time t5 of executing the selecting operation to end the idling revolutions increase control. Thus, although the actual engine revolutions is reduced with the particular engine characteristic response delay as indicated with the double dot line in Scene 8 after time t5, because the actual engine revolutions may be returned to the initial value Nedile0 before starting the slip-engagement of the wet rotary clutch C1 for initial movement in response to the initial movement operation at time t8, the shift shock or sudden start of the wet rotary clutch C1 may be prevented.

On the other hand, even when the selecting operation is executed at time t5 during the idling revolutions increase control (To=T1) from the non-driving range (range P) to the driving range (range D), if the idling revolutions increase control in FIG. 10 continues, the actual engine revolutions reduction is greatly delayed as indicated with the dash line of Scene 5 of FIG. 13. Thus, because the actual engine revolutions is still much higher than the initial value Nedile0 at time t8 of starting the slip-engagement of the wet rotary clutch C1 for initial movement in response to the initial movement operation, the shift shock or sudden start of the wet rotary clutch C1 occurs.

According to the control in Scene 8 indicated with the solid line of FIG. 13, the shift shock or sudden start of the clutch C1 may be avoided.

Further, for convenience, it is explained above that there is no response delay with regard to the selecting operation in the meshing operation of the synchromesh mechanism for the pre-shift in response to the selecting operation from the non-driving range (range P) to the driving range (range D). However, the meshing operation of the synchromesh mechanism for the pre-shift may be executed with an optional response delay for the selecting operation.

As such, if the control for setting the lubricating oil supply amount to be zero (0) for preventing the drag torque is executed until the time of executing the selecting operation, because the lubricating oil supply to the clutch is started before the synchromesh mechanism starts the meshing operation, the meshing operation of the synchromesh mechanism for the pre-shift may become difficult or incomplete due to the drag torque.

Thus, in the present embodiment, the control for setting the lubricating oil supply amount to be zero (0) continues not until the time of executing the selecting operation but until the synchromesh mechanism ends the meshing operation for the pre-shift.

By doing so, because the lubricating oil is not supplied to the clutch before the synchromesh mechanism starts the meshing operation for the pre-shift, the concerns may be resolved that the meshing operation of the synchromesh mechanism for the pre-shift becomes difficult or incomplete.

Also, the idling revolutions increase time To is the time when the remaining lubricating oil amount meets the target remaining lubricating oil amount (the remaining lubricating oil avoiding the drag torque for hindering the meshing operation of the synchromesh mechanism for the pre-shift). However, in order to better secure the operational effects, it may be preferable that the remaining lubricating oil amount is slightly smaller than the target remaining lubricating oil amount.

Further, although FIGS. 6 to 13 show when the driving range is the forward driving range (range D), the operations are the same even when the driving range is the reverse driving range (range R).

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A transmission apparatus, comprising:
   a wet rotary clutch configured to transmit power from an input to an output when in an engaged position;
   a clutch lubricator to supply a lubricating oil to the wet rotary clutch;
   a synchromesh configured to perform a meshing operation while the wet rotary clutch is in the disengaged position;
   a controller configured to increase a revolution speed of the input of the wet rotary clutch before the synchromesh begins the meshing operation; and
   a shift range selector configured to select between a driving shift range and a non-driving shift range,
   wherein the controller is further configured to:
      limit an amount of the lubricating oil supplied to the wet rotary clutch to less than a predetermined amount when the non-driving shift range is selected and when the meshing operation is incomplete; and
      increase the revolution speed of the input of the wet rotary clutch for a predetermined amount of time before the synchromesh mechanism begins performing the meshing operation and while the non-driving shift range is selected.

2. The transmission apparatus of claim 1, wherein the controller is further configured to increase the revolution speed of the input of the wet rotary clutch when the shift range selector is switched from the driving shift range to the non-driving shift range.

3. The transmission apparatus of claim 1, wherein the controller is further configured to increase the revolution speed of the input of the wet rotary clutch when an engine ignition switch is activated and the non-driving shift range is selected.

4. The transmission apparatus of claim 1, wherein the controller prevents the clutch lubricator from supplying lubricating oil to the wet rotary clutch when the non-driving shift range is selected until the synchromesh mechanism completes the meshing operation.

5. The transmission apparatus of claim 1, wherein the predetermined time for increasing the revolution speed of the input of the wet rotary clutch is increased as a temperature of the lubricating oil is decreased.

6. The transmission apparatus of claim 1, wherein the controller is further configured to end the increase of revolution speed of the input of the wet rotary clutch when the driving shift range is selected before the predetermined amount of time elapses.

7. The transmission apparatus of claim 1, wherein the controller is further configured to cease limiting the amount of the lubricating oil supplied to the wet rotary clutch when a temperature of the lubricating oil exceeds a predetermined temperature value.

8. The transmission apparatus of claim 1, wherein an increment of the increase of revolution speed of the input of the wet rotary clutch increases as a temperature of the lubricating oil decreases.

9. The transmission apparatus of claim 1, wherein the controller is prevented from increasing the revolution speed of the input of the wet rotary clutch when a temperature of the lubricating oil exceeds a predetermined temperature value.

10. A method to control a transmission, the method comprising:
    providing a wet rotary clutch comprising an input and an output;
    transmitting power from the input to the output of the wet rotary clutch when in an engaged position;
    supplying a lubricating oil to engage the wet rotary clutch;

performing a meshing operation to gears of the transmission while the wet rotary clutch is in the disengaged position;
increasing a revolution speed to the input of the wet rotary clutch prior to performing the meshing operation; and
limiting an amount of the lubricating oil supplied to the wet rotary clutch to a predetermined amount when a non-driving shift range is selected and when the meshing operation is incomplete.

11. The method of claim 10, further comprising increasing the revolution speed of the input of the wet rotary clutch for a predetermined amount of time before the meshing operation is performed and while a non-driving shift range is selected.

12. The method of claim 10, further comprising increasing the revolution speed of the input of the wet rotary clutch when a shift range is switched from a driving shift range to a non-driving shift range.

13. The method of claim 10, further comprising increasing the revolution speed of the input of the wet rotary clutch when an engine ignition switch is activated and a non-driving shift range is selected.

14. The method of claim 10, further comprising preventing the clutch lubricator from supplying lubricating oil to the wet rotary clutch when a non-driving shift range is selected until the meshing operation is compete.

15. The method of claim 10, further comprising further increasing the revolution speed of the input of the wet rotary clutch as a temperature of the lubricating oil falls below a predetermined value.

16. A transmission apparatus, comprising:
a clutch means for transmitting power from an input to an output when in an engaged position;
a lubricator means for supplying a lubricating oil to engage the clutch means; and
a synchromesh means for performing a meshing operation while the clutch means is in the disengaged position;
a controller configured to increase a revolution speed of the input of the clutch means before the synchromesh means begins performing the meshing operation; and
a means for selecting between a driving shift range and a non-driving shift range; and
wherein the controller is further configured to limit an amount of the lubricating oil supplied to the clutch means to be less than a predetermined amount when the non-driving shift range is selected and when the meshing operation is incomplete.

17. The transmission apparatus of claim 16, further comprising:
a means for selecting between a driving shift range and a non-driving shift range; and
wherein the controller is further configured to increase the revolution speed of the input of the clutch means for a predetermined amount of time before the synchromesh means begins performing the meshing operation and while the non-driving shift range is selected.

* * * * *